US007815313B2

(12) United States Patent
Ito et al.

(10) Patent No.: US 7,815,313 B2
(45) Date of Patent: Oct. 19, 2010

(54) DRIVE SENSE ADJUSTING APPARATUS AND DRIVE SENSE ADJUSTING METHOD

(75) Inventors: Mitsuhito Ito, Chigasaki (JP); Youji Shimizu, Yokohama (JP); Katsunori Okada, Yokosuka (JP); Keijiro Iwao, Yokohama (JP); Akihiro Matsushita, Yokosuka (JP); Kenya Uenuma, Yokohama (JP); Hiroto Nakashima, Yokosuka (JP); Yoshikazu Hatano, Hiratsuka (JP); Takashi Sunda, Yokosuka (JP)

(73) Assignee: Nissan Motor Co., Ltd., Yokohama-shi, Kanagawa-ken (JP)

(*) Notice: Subject to any disclaimer, the term of this patent is extended or adjusted under 35 U.S.C. 154(b) by 1482 days.

(21) Appl. No.: 11/191,015

(22) Filed: Jul. 28, 2005

(65) Prior Publication Data

US 2006/0022808 A1 Feb. 2, 2006

(30) Foreign Application Priority Data

Aug. 2, 2004 (JP) .......................... P2004-225820
May 18, 2005 (JP) .......................... P2005-145404

(51) Int. Cl.
*G03B 21/00* (2006.01)

(52) U.S. Cl. .................................... 353/13; 340/425.5

(58) Field of Classification Search .................. 353/12, 353/13, 14; 340/705, 439, 980, 425.5
See application file for complete search history.

(56) References Cited

U.S. PATENT DOCUMENTS

| | | | | |
|---|---|---|---|---|
| 4,962,998 | A * | 10/1990 | Iino | 359/630 |
| 5,028,912 | A * | 7/1991 | Iino | 345/7 |
| 5,051,735 | A * | 9/1991 | Furukawa | 345/7 |
| 5,410,346 | A * | 4/1995 | Saneyoshi et al. | 348/116 |
| 5,506,595 | A * | 4/1996 | Fukano et al. | 345/7 |
| 6,727,807 | B2 * | 4/2004 | Trajkovic et al. | 340/436 |
| 6,774,772 | B2 * | 8/2004 | Hahn | 340/439 |
| 6,789,901 | B1 * | 9/2004 | Kormos | 353/13 |
| 6,947,064 | B1 * | 9/2005 | Hahn et al. | 701/301 |
| 7,382,288 | B1 * | 6/2008 | Wilson et al. | 340/972 |
| 7,519,471 | B2 * | 4/2009 | Shibata et al. | 701/211 |
| 2002/0011925 | A1 * | 1/2002 | Hahn | 340/425.5 |
| 2004/0016870 | A1 * | 1/2004 | Pawlicki et al. | 250/208.1 |
| 2005/0134479 | A1 * | 6/2005 | Isaji et al. | 340/901 |
| 2005/0219057 | A1 * | 10/2005 | Ihara et al. | 340/575 |
| 2008/0158096 | A1 * | 7/2008 | Breed | 345/7 |

FOREIGN PATENT DOCUMENTS

| | | |
|---|---|---|
| JP | 11-149272 A | 6/1999 |

* cited by examiner

*Primary Examiner*—Que T Le
*Assistant Examiner*—Jerry Brooks
(74) *Attorney, Agent, or Firm*—McDermott Will & Emery LLP

(57) ABSTRACT

A control unit presents a visual stimulus onto a film adhered on an inner surface of a windscreen glass of a vehicle, and controls the visual stimulus so as to allow a driver to perceive the visual stimulus approaching the driver or receding therefrom in response to detection results of a driving environment detection unit, a vehicle status detection unit and a driver status detection unit. In such a way, visually induced vection can be produced for the driver by the visual stimulus. Accordingly, a drive sense of the driver can be adjusted in response to a vehicle state quantity, a driving environment and a driver state.

15 Claims, 29 Drawing Sheets

DRIVE SENSE ADJUSTING APPARATUS AND DRIVE SENSE ADJUSTING METHOD

BACKGROUND OF THE INVENTION

The present invention relates to a drive sense adjusting apparatus and a drive sense adjusting method, which are for adjusting a drive sense of a driver by presenting a visual stimulus into a vision of the driver.

Heretofore, as disclosed in Japanese Patent Laid-Open Publication No. H11-149272, there has been known a speed sense correcting device for controlling a speed sense of a driver by presenting, as a visual stimulus to the driver, a pattern (reverse-running pattern) moving so as to recede from a vision of the driver. According to such a speed sense correcting device, an incorrect speed sense formed in the driver's brain after high-speed running can be corrected in a short time, and a safe drive can be ensured in a drive that follows.

SUMMARY OF THE INVENTION

However, the speed sense correcting device described above is configured in order to correct a contradiction in the speed sense of the driver, and accordingly, cannot stabilize a drive sense of the driver more by adjusting the drive sense concerned of the driver. Moreover, the speed sense correcting device described above is one that controls the speed sense of the driver, and accordingly, cannot control drive senses of the driver other than the speed sense, which are such as a heading perception and equilibrium sense of the driver.

The present invention has been made in order to solve the above-described problems. It is an object of the present invention to provide a drive sense adjusting apparatus and a drive sense adjusting method, which are capable of adjusting a drive sense of a driver and stabilizing the drive sense of the driver more by presenting a visual stimulus into a vision of the driver.

In order to achieve the above-described object, a drive sense adjusting apparatus and a drive sense adjusting method according to the present invention display a visual stimulus, and control the visual stimulus so as to allow a driver to perceive the visual stimulus approaching the driver or receding therefrom in response to at least one of a driving environment, a vehicle condition, and a driver condition.

Moreover, a drive sense adjusting apparatus according to the present invention is provided in a vehicle, and includes: a visual stimulus presentation unit for presenting a visual stimulus to a display screen, the visual stimulus presentation unit being provided in a vision of a driver; and an imaging unit for imaging a video outside of the vehicle, the imaging unit being disposed on a vertical plane including a straight line connecting an eyeball position of the driver and a center portion of the display screen to each other or at a position where the straight line and an optical axis substantially coincide with each other, wherein the visual stimulus presentation unit presents the video outside of the vehicle as the visual stimulus onto a display screen, the video being imaged by the imaging unit.

Furthermore, a drive sense adjusting apparatus according to the present invention is provided in a vehicle, and includes: a visual stimulus presentation unit for presenting a visual stimulus to a display screen, the visual stimulus presentation unit being provided in a vision of a driver; and a visual stimulus creation unit for creating the visual stimulus presented by the visual stimulus presentation unit, wherein the visual stimulus creation unit creates a visual stimulus equivalent to a road optical flow accompanied with a vehicle motion corresponding to a sight direction of the driver to the visual stimulus presentation unit.

According to the drive sense adjusting apparatus and the drive sense adjusting method in accordance with the present invention, visually induced vection can be produced for the driver by the visual stimulus. Accordingly, the drive sense of the driver is adjusted, thus making it possible to stabilize the drive sense of the driver more.

Moreover, according to the drive sense adjusting apparatus in accordance with the present invention, a direction perpendicular to the screen of the visual stimulus presentation unit and a direction of a displayed image are substantially the same. Accordingly, when the driver visually recognizes the display screen, the image outside of the video, which is displayed on the display screen, and an environment outside of the vehicle, are easily associated with each other, thus making it possible to stabilize the drive sense of the driver.

Furthermore, according to the drive sense adjusting apparatus in accordance with the present invention, the visual stimulus equivalent to the road optical flow accompanied with the vehicle motion is presented into a peripheral vision of the driver, which is obstructed by functional components of the vehicle in a usual vehicle structure. Accordingly, an area of the entire road optical flow perceived by the driver is increased, thus facilitating for the driver to perceive the heading direction.

DETAILED DESCRIPTION OF THE PREFERRED EMBODIMENTS

The inventors of the present application have repeatedly performed an energetic research aiming at visually induced vection. As a result, the inventors have found that, even if physical quantities such as pitching, rolling and yawing are not varied in a vehicle motion, a drive sense of a driver can be adjusted by presenting certain visual information thereto. Note that the above-described visually induced vection means a motion sense caused by visual information though oneself stands still. For example, the vection is a sense felt as if a standing railcar on which oneself is on board were moving when oneself views another railcar starting to move from a window of the standing railcar. Description will be made below in detail of a configuration and operation of a drive sense adjusting apparatus serving as embodiments of the present invention created based on the above-described finding with reference to the drawings. Note that, though the drive sense adjusting apparatus mainly controls a heading perception of the driver in the embodiments to be described below, it is a matter of course that the present invention is not limited to the control for the heading perception, and for example, can also be applied to processing for controlling an equilibrium sense of the driver.

Figure 1:
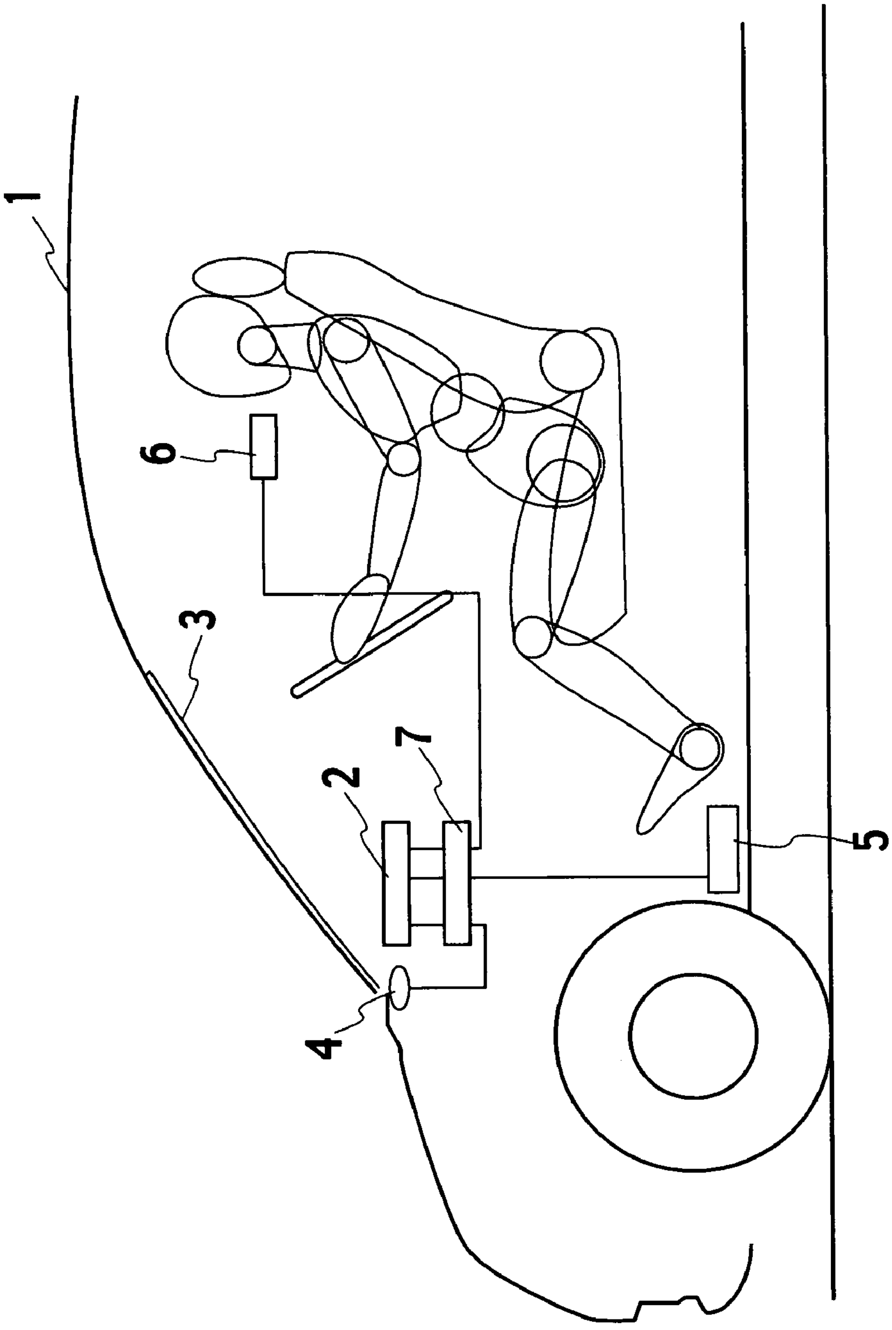
FIG. 1 is a schematic view showing a configuration of a drive sense adjusting apparatus serving as a first embodiment of the present invention.

As shown in FIG. 1, a drive sense adjusting apparatus serving as a first embodiment of the present invention includes, as main constituents, a projector 2 mounted on a vehicle 1 and provided on an upper portion of an instrument panel of the vehicle 1, a film 3 formed of a louver-like member, which is adhered on an inner surface of a windscreen glass of the vehicle 1, a driving environment detection unit 4 for detecting a driving environment outside of the vehicle, a vehicle status detection unit 5 for detecting a state quantity of the vehicle 1, a driver status detection unit 6 for detecting a drive state of the driver, and a control unit 7 for controlling visual stimulus presentation processing to be described later.

The driving environment detection unit 4 detects a scene image, a light quantity and a rainfall quantity outside of the vehicle as information indicating the driving environment outside of the vehicle. Moreover, the vehicle status detection unit 5 detects pitching, rolling, yawing, an acceleration G, a vehicle speed, a rolling angle, a steering angle and a steering angle speed as information indicating the state quantity of the vehicle 1. Furthermore, the driver status detection unit 6 detects an image of the driver and a physiological state of the driver, such as muscle potentials, brain waves, a heartbeat and a pulse, as information indicating the drive state of the driver.

The control unit 7 produces a visual stimulus in response to detection results of the driving environment detection unit 4, the vehicle status detection unit 5 and the driver status detection unit 6, displays the produced visual stimulus on the film 3 by controlling the projector 2, thereby presenting the visual stimulus to the driver. Note that, though the control unit 7 presents the visual stimulus onto the film 3 provided on the inner surface of the windscreen glass in this embodiment, the control unit 7 may present the visual stimulus by providing the film 3 on surfaces of other regions such as an upper face portion of the instrument panel, a front pillar portion, a headlining portion and a sun visor portion.

Then, the drive sense adjusting apparatus having such a configuration as described above executes the visual stimulus presentation processing to be described below, thereby adjusting and stabilizing the drive sense of the driver. Description will be made below in detail of the operation of the drive sense adjusting apparatus in the case of executing the visual stimulus presentation processing with reference to FIG. 2.

Figure 2:
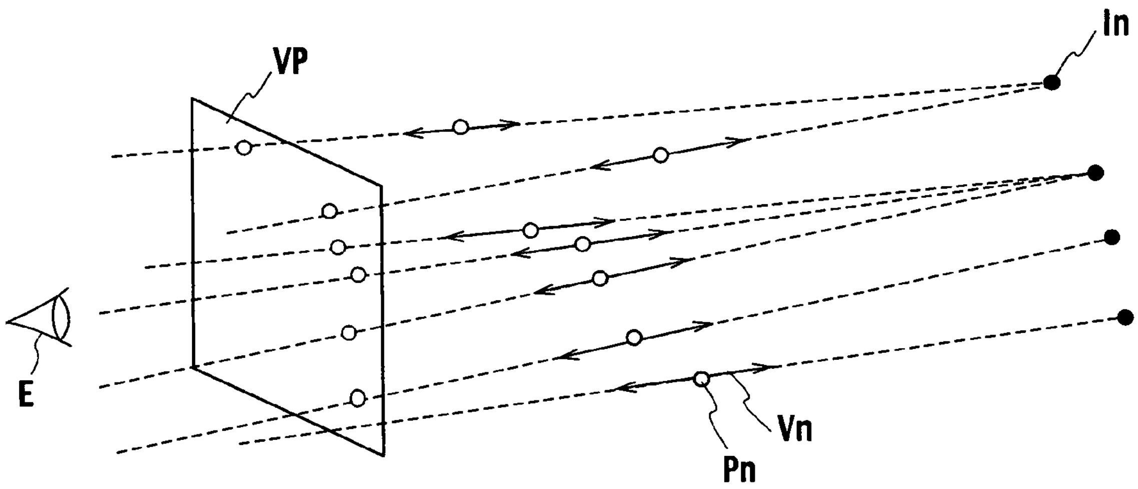
FIG. 2 is a view for explaining a configuration of a visual stimulus presented to a driver by the drive sense adjusting apparatus shown in FIG. 1.

In the case of performing the visual stimulus presentation processing, as shown in FIG. 2, the control unit 7: (1) sets plural virtual spots In (n=1 to n) infinitely far within a vision of the driver; (2) assumes light spots Pn (n=1 to n) approaching the driver or receding therefrom from the respective virtual spots In at speeds Vn (n=1 to n); and (3) projects the light spots Pn on a virtual plane VP set within the vision of the driver. Then, the control unit 7 controls the projector 2, thereby displaying motions of the light spots Pn on the virtual plane VP on the film 3 disposed within the vision of the driver.

Figure 3:
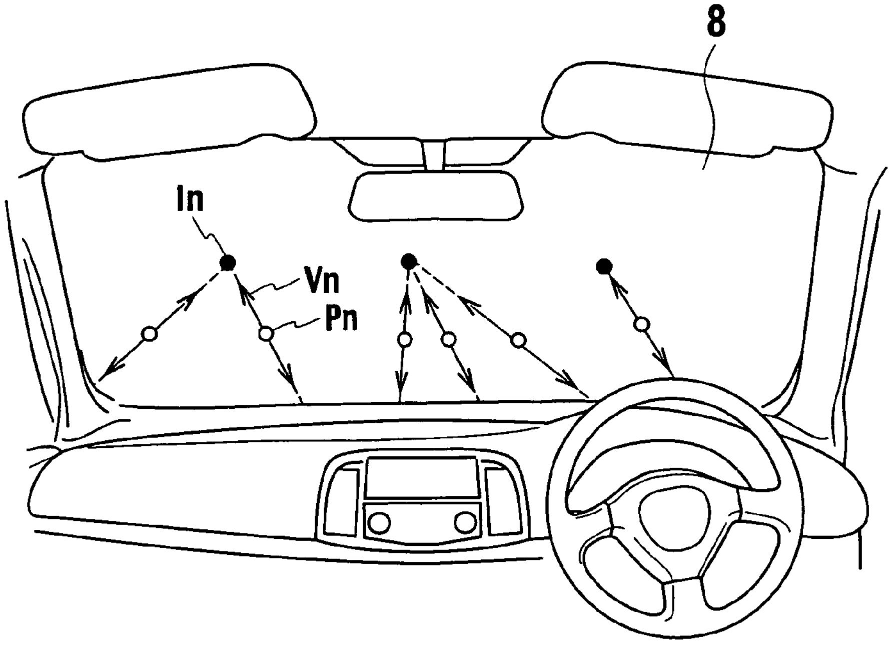
FIG. 3 is a view showing an example of the visual stimulus presented to the driver by the drive sense adjusting apparatus shown in FIG. 1.

With such a configuration, motions of the light spots Pn approaching the driver or receding therefrom, which are as shown in FIG. 3, are presented as the visual stimulus onto the windscreen glass 8 of the vehicle 1, and by the visual stimulus, the visually induced vection can be produced for the driver. Accordingly, the heading perception of the driver can be controlled.

Note that, though the inventors of the present application have confirmed that it is possible to control the heading perception of the driver even when a size of the light spots Pn is sufficiently small, a shape of the light spots Pn maybe a bar shape and a rectangular shape depending on an external environment such as a road environment. Moreover, the size of the light spots Pn may be arbitrary as long as the light spots Pn do not adversely affect a front view of the driver. Moreover, though the speeds Vn are given to the respective light spots Pn in this embodiment, the speeds of the respective light spots Pn may be varied depending on positions thereof within the vision of the driver, or uniform speeds may be given to the respective light spots Pn in matching with the vehicle speed of the vehicle 1.

Figure 4:
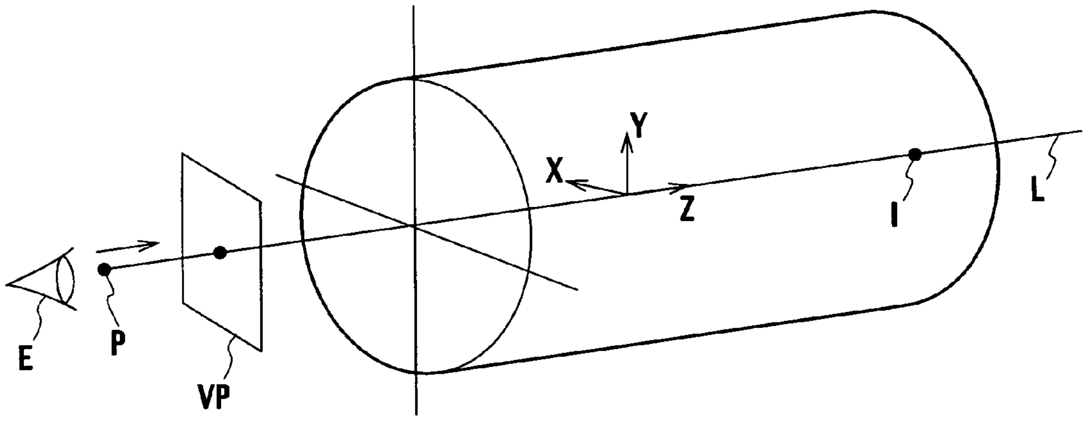
FIG. 4 is a view for explaining a configuration of an application example of the visual stimulus presented to the driver by the drive sense adjusting apparatus shown in FIG. 1.

Moreover, though the control unit 7 produces the visual stimulus by assuming the virtual spots In infinitely far forward the driver in this embodiment, a motion of a light spot as shown in FIG. 4 may be presented as the visual stimulus. The light spot in this case is obtained in such a manner as below. (1) In a space within the vision of the driver, assumed is an aggregate of light spot shaving a uniform density distribution or a density distribution corresponding to distances X, Y and Z (X, Y and Z denote a horizontal direction, a vertical direction and a coaxial direction with respect to a straight line L connecting a spot P and a virtual spot I assumed infinitely far forward the driver to each other); (2) the aggregate of light spots is moved forward from the spot P to the virtual spot I or moved back from the virtual spot I to the spot P; and (3) a motion of a light spot projected on a virtual plane VP set within the vision of the driver is presented as the visual stimulus.

With such a configuration as described above, viewed from the driver, the visual stimulus approaching the driver is perceived like spring out of the virtual spot I, and on the contrary, the visual stimulus receding therefrom is perceived like vanishing to the virtual spot I. In particular, when the spot P is located at an eyeball position E of the driver or in the vicinity of the eyeball position E, it becomes further easy for the driver to perceive such a sense, and accordingly, it becomes possible to precisely control the heading perception of the driver by means of the motion of the visual stimulus.

Figure 5A:
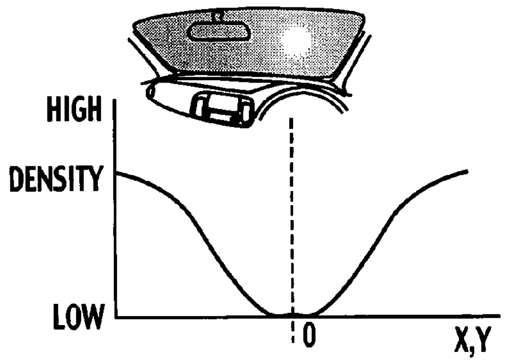
FIGS. 5A to 5C are views showing examples where a density distribution of light spots in a region shown in FIG. 4 is changed on an XY plane.
Figure 5B:
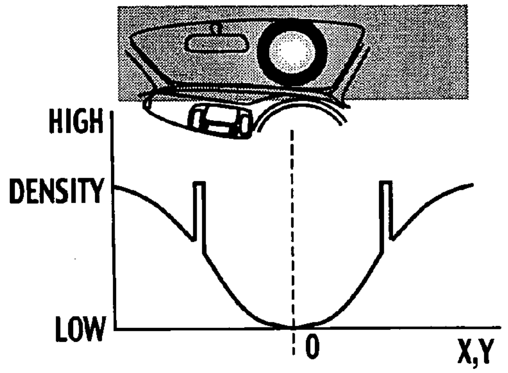
Figure 5C:
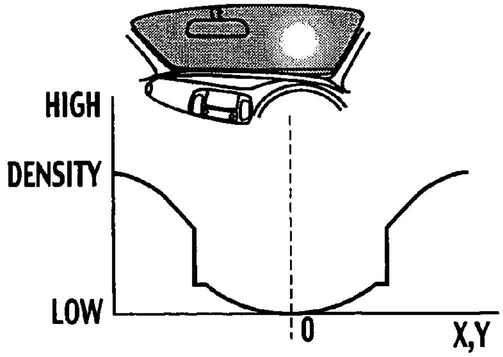

Note that, as an example of changing the density distribution of the light spots correspondingly to the distances X, Y and Z, there is a case of lowering the density of the light spots on a center portion of an XY plane, for example as shown in FIG. 5A. With such a configuration as described above, a transparency of the visual stimulus in the vicinity of an origin displayed on the virtual plane VP can be enhanced. Moreover, density distributions as shown in FIGS. 5B and 5C are provided on the XY plane, thus enabling the driver to perceive ring-like (FIG. 5B) and tunnel-like (FIG. 5C) visual stimuli having a fixed distance from the driver. Note that, though the examples shown in FIGS. 5A, 5B and 5C are examples of changing the density distributions of the light spots on the XY plane, the density distributions of the light spots may also be varied in response to the respective distances in the X, Y and Z directions.

As apparent from the above description, in the drive sense adjusting apparatus serving as the first embodiment of the present invention, the control unit 7 presents the visual stimulus onto the film 3 adhered on the inner surface of the windscreen glass 8 of the vehicle 1, and controls the visual stimulus approaching the driver or receding therefrom to be perceived by the driver in response to the detection results of the driving environment detection unit 4, the vehicle status detection unit 5 and the driver status detection unit 6, thereby producing the visually induced vection in the driver by means of the visual stimulus. Accordingly, the drive sense of the driver can be adjusted in response to the vehicle state quantity, the driving environment and the driver state.

Moreover, in the drive sense adjusting apparatus serving as the first embodiment of the present invention, the control unit 7 controls the visual stimulus approaching the driver or receding therefrom from at least one virtual spot In to be perceived by the driver, and guides awareness of the driver to the direction of the virtual spot In. Accordingly, the heading perception of the driver can be adjusted in response to various situations.

A drive sense adjusting apparatus serving as a second embodiment of the present invention has the same configuration as that of the drive sense adjusting apparatus serving as the first embodiment. The control unit 7: (1) based on the eyeball position E of the driver and the steering angle, estimates a focus of expansion F caused by which the vehicle 1 moves forward or back; and (2) arranges plural virtual spots I in a near-field region FR of the focus of expansion F.

Figure 6B:
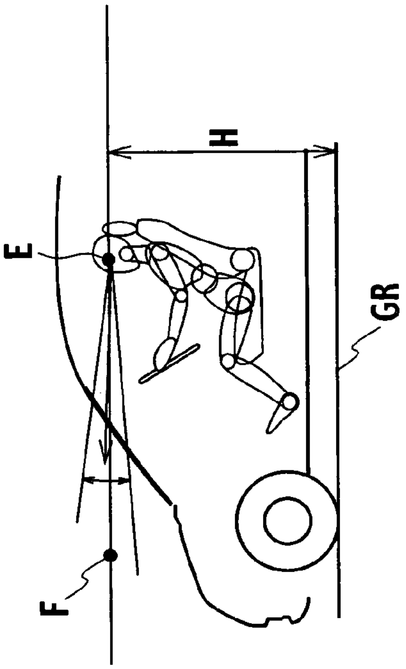
FIGS. 6A to 6C are views for explaining a configuration of a visual stimulus presented to the driver by a drive sense adjusting apparatus serving as a second embodiment of the present invention.
Figure 6A:
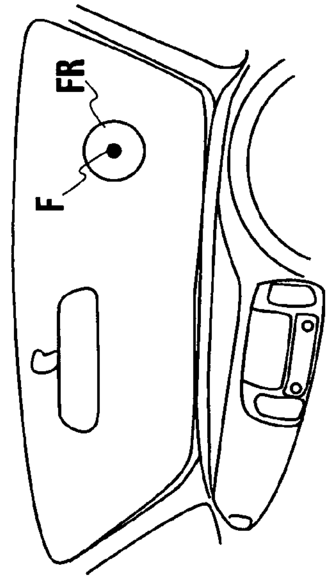
Figure 6C:
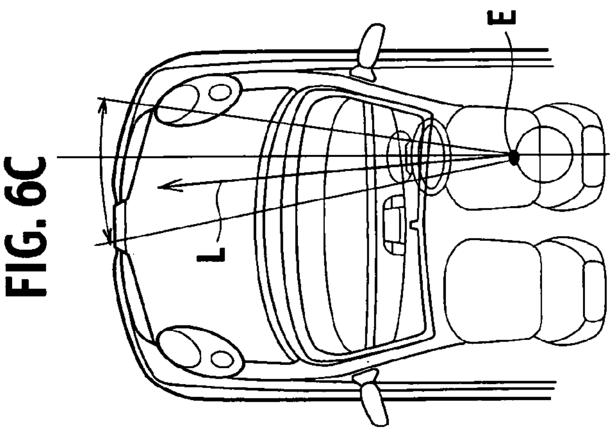

Specifically, as shown in FIGS. 6B and 6C, the control unit 7: (1) estimates the eyeball position E of the driver; (2) calculates a line segment L extending in the horizontal direction from the estimated eyeball position E at a height H from a road surface GR and in parallel to the vehicle heading direction from the eyeball position E; (3) sets an infinitely far point on the line segment L as the focus of expansion F; and (4) arranges the plural virtual spots I on the near-field region FR (refer to FIG. 6A) of the focus of expansion F.

Here, the control unit 7 estimates the eyeball position E of the driver based on a seated position (a height of a seat cushion, a sliding quantity of a seat, and a seatback angle) of the driver and standard dimensions of a human body. Note that, in the case of estimating the eyeball position E more precisely, it is recommended to image a face of the driver by a stereo camera, and to estimate the eyeball position E by pattern matching processing.

Moreover, in general, the focus of expansion F is one that indicates the motion direction of the vehicle with respect to the global coordinate system. Accordingly, in the vehicle in which the heading direction is changed constantly by causes such as road unevenness, it is difficult to exactly specify the position of the focus of expansion F. Therefore, the control unit 7 arranges the plural virtual spots I in the near-field region FR of the focus of expansion F, and presents, as the visual stimulus to the driver, the light spots each of which irregularly repeats occurrence and vanishment or moves in each virtual spot I. With such a configuration as described above, in comparison with the case where the visual stimulus is generated from a fixed virtual spot I, the heading perception of the driver can be stably maintained.

Figure 7:
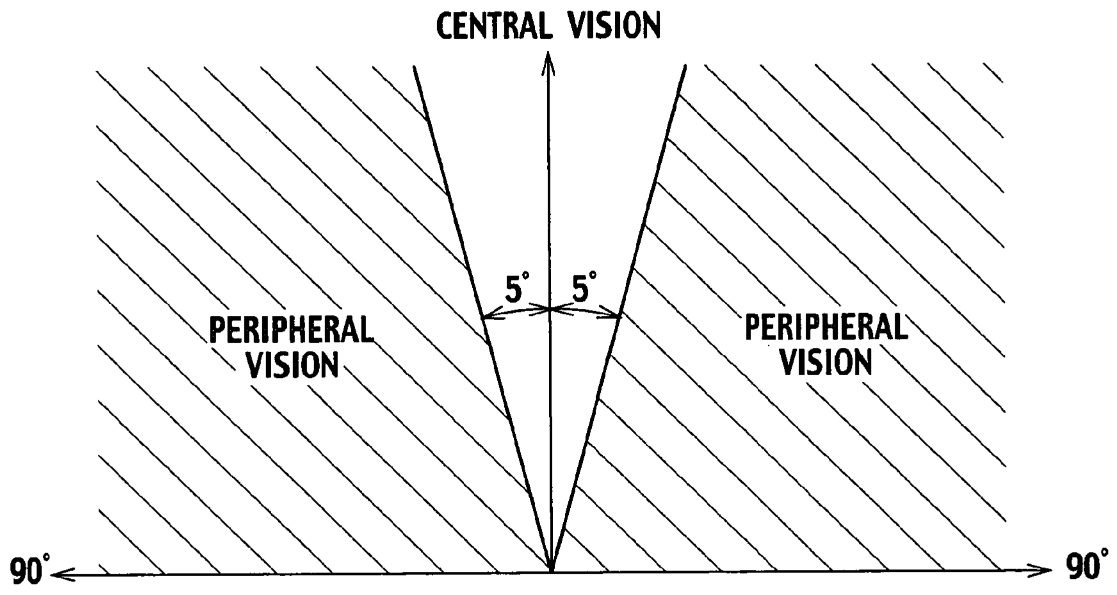
FIG. 7 is a view for explaining a discrimination range of a heading perception.

Note that, though it is difficult to define a discrimination of the heading perception because a definition of the vicinity thereof differs depending on a road situation and a driving scene, it is said that, as shown in FIG. 7 from an experiment, a discrimination range is within approximately ±5 degrees with respect to a central vision of the driver, and that other regions than the above are a peripheral vision (for detail, refer to THE VISION SOCIETY OF JAPAN, Ed., Visual Information Processing Handbook (in Japanese), Asakura Shoten). Hence, it is desirable to arrange the virtual spots I in the near-field region within an angle range of approximately 5 to 10 degrees with the focus of expansion F (central vision) taken as a center.

Figure 8:
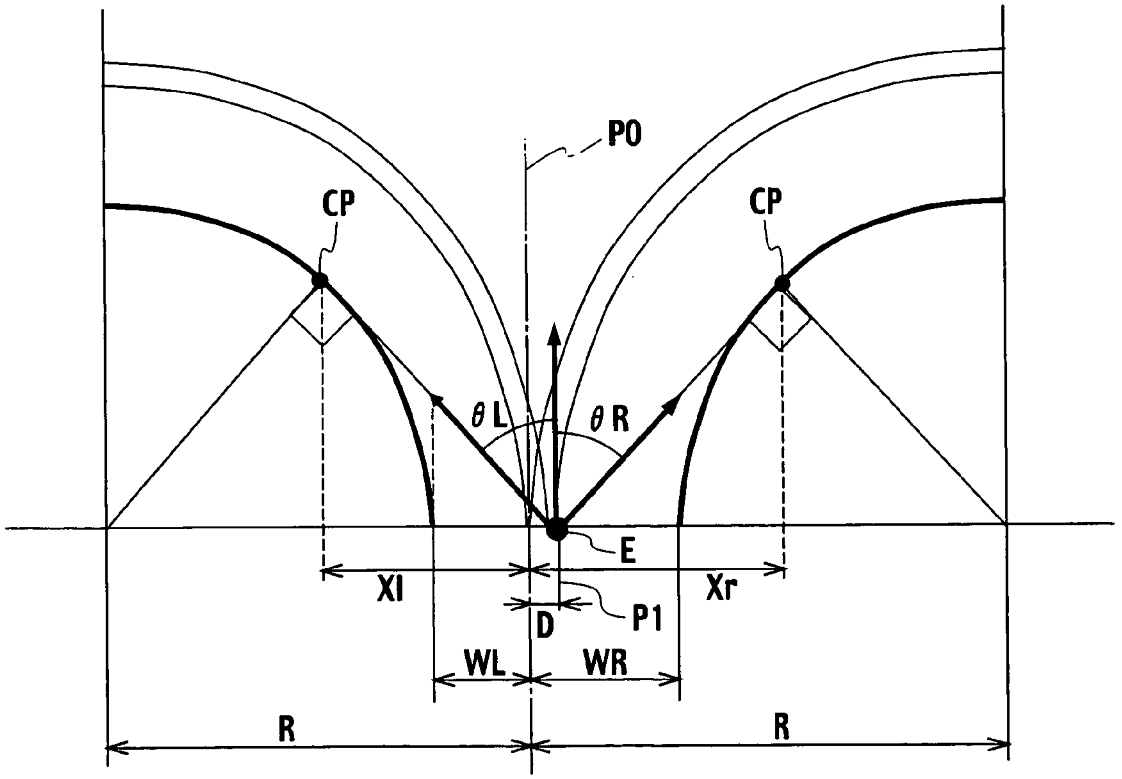
FIG. 8 is a view for explaining a position calculation method for a turning focus when a vehicle turns.

Moreover, when the vehicle steadily turns, the control unit 7 makes the following definitions as shown in FIG. 8. An offset amount of a driver's seat center P1 with respect to a vehicle center P0 and a turning radius of the vehicle are denoted by D and R, respectively. Walls are defined at positions of distances WR and WL from right and left sides of the vehicle. Tangential directions θR and θL from the eyeball position E with respect to inner walls at the turning (tangential directions on points CP of the walls) are defined as directions of the focus of expansion F with respect to the heading direction of the vehicle.

Note that the directions θR and θL of the focus of expansion F are represented by the following Formulae 1 and 2. Moreover, the offset amount D of the driver's seat center P1 with respect the vehicle center P0 is regarded as positive in the case where the driver's seat center P1 is offset in the right direction with respect to the vehicle center P0. Moreover, parameters such as the turning radius R, the distance WL and the distance WR may be defined based on actual distances with reference to information from a car navigation system on, for example, a highway, or may be estimated based on a detection result of a sight direction of the driver. Moreover, the turning radius R may be estimated based on the vehicle speed and the steering angle.

$$\theta R=\cos^{-1}\{(R-WR)/(R-D)\} \quad \text{[Formula 1]}$$

$$\theta L=\cos^{-1}\{(R-WL)/(R+D)\} \quad \text{[Formula 2]}$$

Figure 9:
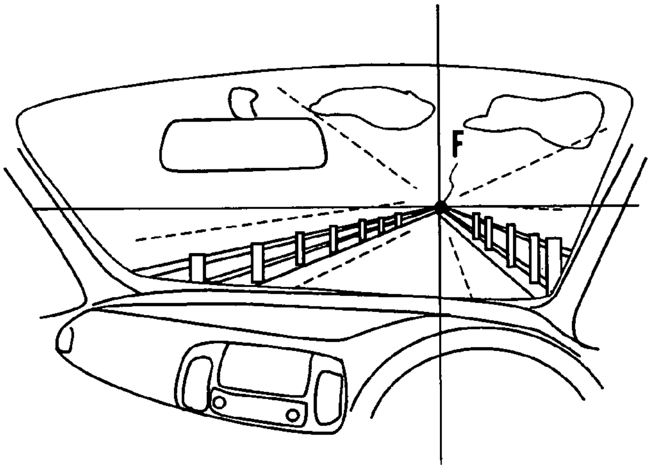
FIG. 9 is a view showing an example of the visual stimulus presented to the driver by the drive sense adjusting apparatus serving as the second embodiment of the present invention when the vehicle travels straight ahead.
Figure 10:
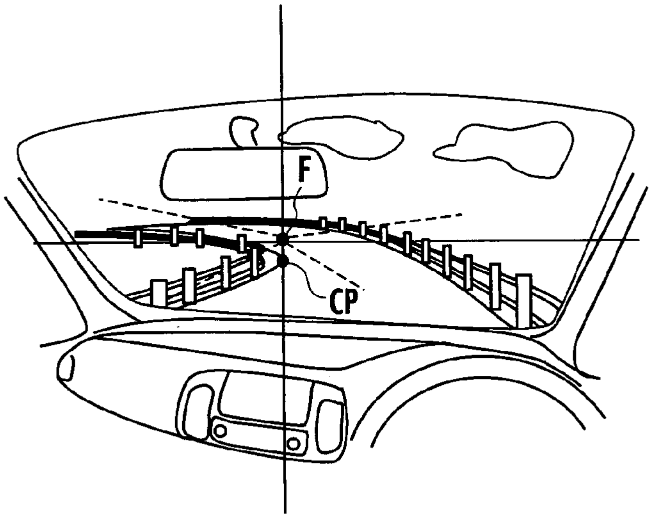
FIG. 10 is a view showing an example of the visual stimulus presented to the driver by the drive sense adjusting apparatus serving as the second embodiment of the present invention when the vehicle turns.

Moreover, in this embodiment, when the vehicle is going straight ahead, the visual stimulus is presented to the driver like spring out of the focus of expansion F generated as the vehicle travels ahead, as shown by dotted lines in FIG. 9. Meanwhile, when the vehicle is turning, the visual stimulus is presented to the driver like spring out of the vicinity of the focus of expansion F generated by the turning of the vehicle toward a direction of the sum of vectors of the turning direction and the heading direction, as shown by dotted lines in FIG. 10.

As apparent from the above description, according to the drive sense adjusting apparatus serving as the second embodiment of the present invention, the control unit 7 arranges the plural virtual spots I in the near-field region FR of the focus of expansion F, and presents, as the visual stimulus to the driver, the light spots each of which irregularly repeats occurrence and vanishment or moves in each virtual spot I. Accordingly, in comparison with the case where the visual stimulus is generated from the fixed virtual spot I, the heading perception of the driver can be stably maintained.

Figure 11:
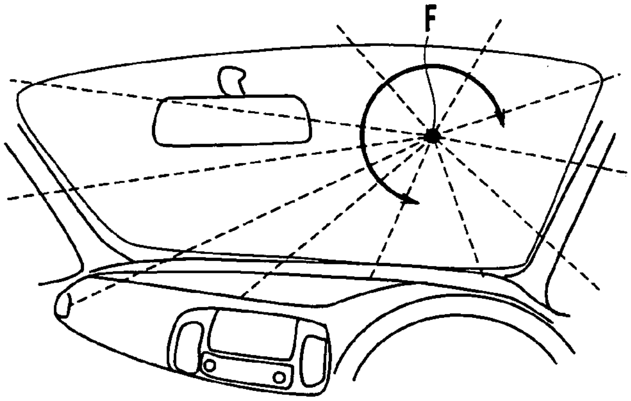
FIG. 11 is a view showing an application example of the visual stimulus presented to the driver by the drive sense adjusting apparatus serving as the second embodiment of the present invention when the vehicle turns.

Here, in this embodiment, as shown in FIG. 11, in response to an angle variation of a vector of acceleration about an axis of the vehicle heading direction, the acceleration being applied to the driver or the vehicle 1 at the time of turning, the control unit 7 may rotationally displace the visual stimulus about the focus of expansion F and in the same direction as that of the angle variation of the acceleration vector. Note that, at this time, a rotational displacement of the visual stimulus does not have to be equivalent to an angle variation ΔG of the acceleration vector, and for example, may be made proportional to multiples of the angle variation ΔG, such as a half, one-third of the angle variation ΔG and double and triple the angle variation ΔG concerned. Moreover, the acceleration vector may be directly measured by using a lateral acceleration sensor, a pendulum and the like, or may be estimated based on the vehicle state quantity such as the vehicle speed and the steering angle. Furthermore, on the contrary to the object of the present invention, an angular velocity of the visual stimulus may be a cause to disturb the equilibrium sense of the driver when the angular velocity concerned is too large. Accordingly, an upper limit value may also be set for the angular velocity by means of filter processing and the like.

With such a configuration as described above, in response to the variation of the acceleration vector applied to the driver or the vehicle 1 at the time of turning, posture guidance for a head posture inclined by the driver can be easily performed. Specifically, at the time of turning, the driver inclines the head, and an inclination of the outside viewed from the head is then increased in a reverse direction. In this case, the visual stimulus presented into the vision of the driver is rotationally displaced in the same direction as the inclination direction of the head, and thus it is made possible to compensate a motion of a visual element, such as a window frame, displaced in the reverse direction within the vision of the driver, which is one of causes to damage the equilibrium sense. Accordingly, the inclination displacement of the head at the time of turning can be stably guided, and the equilibrium sense of the driver can be stably maintained.

Figure 12:
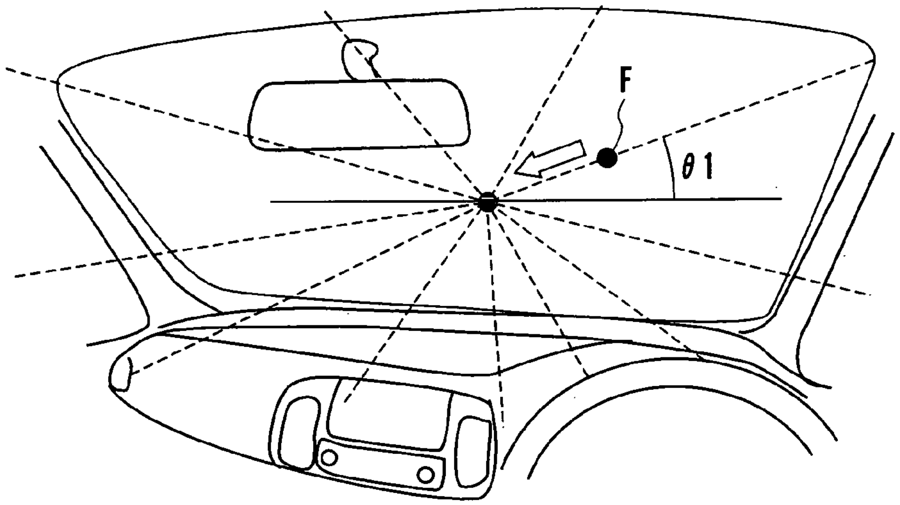
FIG. 12 is a view showing an application example of the visual stimulus presented to the driver by the drive sense adjusting apparatus serving as the second embodiment of the present invention when the vehicle turns.

Moreover, in this embodiment, in response to the steering angle θ, the control unit 7 may also move the focus of expansion F in the left or right direction and the lower direction. Specifically, when the steering angle is varied by the angle θ in the left direction, as shown in FIG. 12, the control unit 7 moves the focus of expansion F in the diagonal lower left direction so that an angle made of the moving direction of the focus of expansion F and the horizontal direction can be θ1 (=kθ, where k is a constant). In general, at the time of turning, the head posture of the driver faces to the inner direction of the turning, and a viewpoint thereof, that is, an eye height moves in the lower direction owing to an influence of an inclination of an upper part of the body and the head or of a steering operation.

At this time, if no visual stimulus is presented, and the driver undesirably maintains a higher viewpoint position than a viewpoint lowered accompanied with a proper change of the driving posture owing to some influence of a vibration disturbance and the like, then a lower acceleration applied to the head is reduced momentarily, and there occurs a momentary feeling of wrongness in equilibrium sense, which is just like a discomfort at a moment when an elevator starts to descend. Hence, the focus of expansion F is moved in the left or right direction and the lower direction in response to the steering angle θ, thus making it possible to stably guide the height variation of the head position, and to stably maintain the equilibrium sense of the driver.

Figure 13:
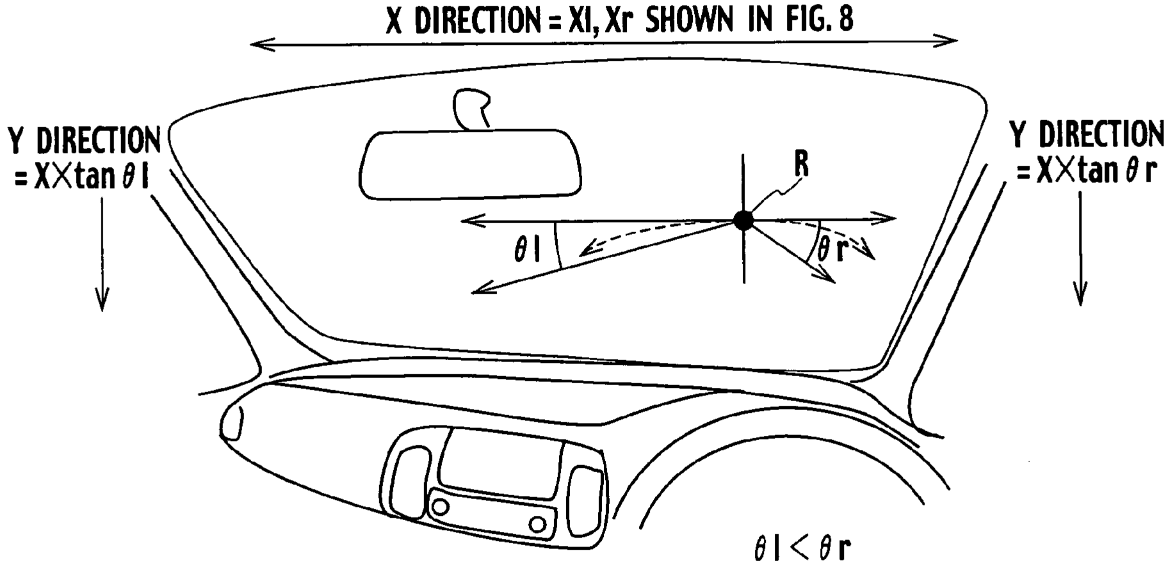
FIG. 13 is a view for explaining moving quantities of a focus of expansion when the vehicle turns to the left and the right.

Moreover, when the focus of expansion F is moved in the left or right direction and the lower direction in response to the steering angle θ, the control unit 7 may vary a moving quantity of the focus of expansion F between a left turning and a right turning. Specifically, in the case of a vehicle in which the driver's seat is on the right side, when angles made of the moving direction of the focus of expansion F and the horizontal direction in the left turning and the right turning are defined as θl and θr, respectively, as shown in FIG. 13, the control unit 7 sets the angle θr to be larger than the angle θl, and makes a setting so that the moving quantity of the focus of expansion F with respect to a steering quantity in the left direction can be larger than the moving quantity of the focus of expansion F with respect to a steering quantity in the right direction. Note that, in this case, a lower moving quantity may be unchanged in between the left direction and the right direction. Moreover, a moving orbit of the focus of expansion F may be made as a curved orbit protruding upward as shown by a dotted line in FIG. 13.

Figure 14A:
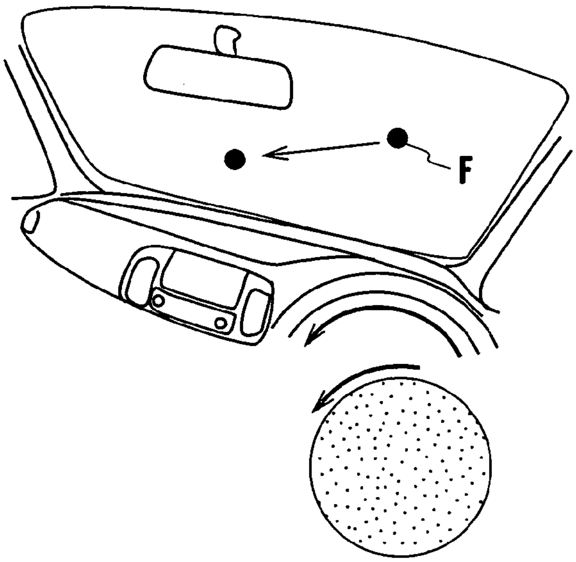
FIGS. 14A to 14C are views showing application examples of the visual stimulus presented to the driver by the drive sense adjusting apparatus serving as the second embodiment of the present invention when the vehicle turns.
Figure 14B:
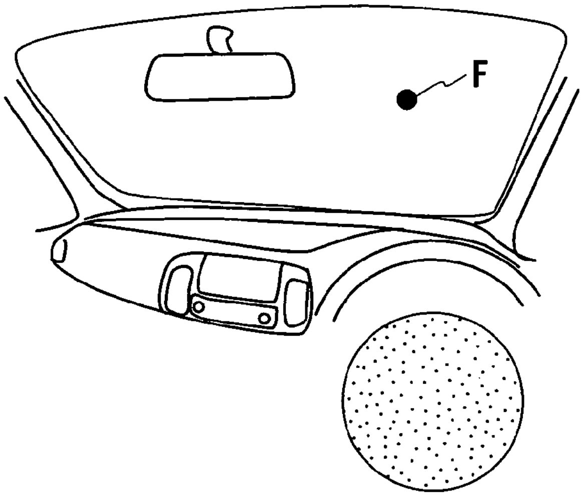
Figure 14C:
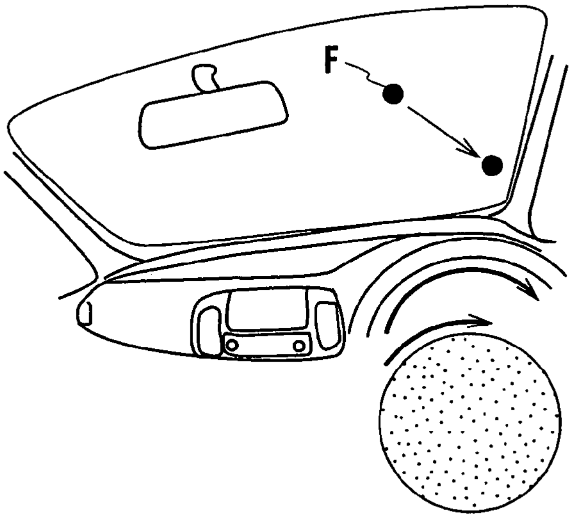

Moreover, in the case of moving the focus of expansion F in the left or right direction and the lower direction in response to the steering angle θ, as shown in FIGS. 14A, 14B and 14C, in response to the angle variation of the vector of acceleration about the axis of the vehicle heading direction, the acceleration being applied to the driver or the vehicle 1 at the time of turning, the control unit 7 may rotationally displace the visual stimulus about the focus of expansion F and in the same direction as that of the angle variation of the acceleration vector. With such a configuration as described above, the effect of stabilizing the equilibrium sense of the driver can be increased more.

Figure 15A:
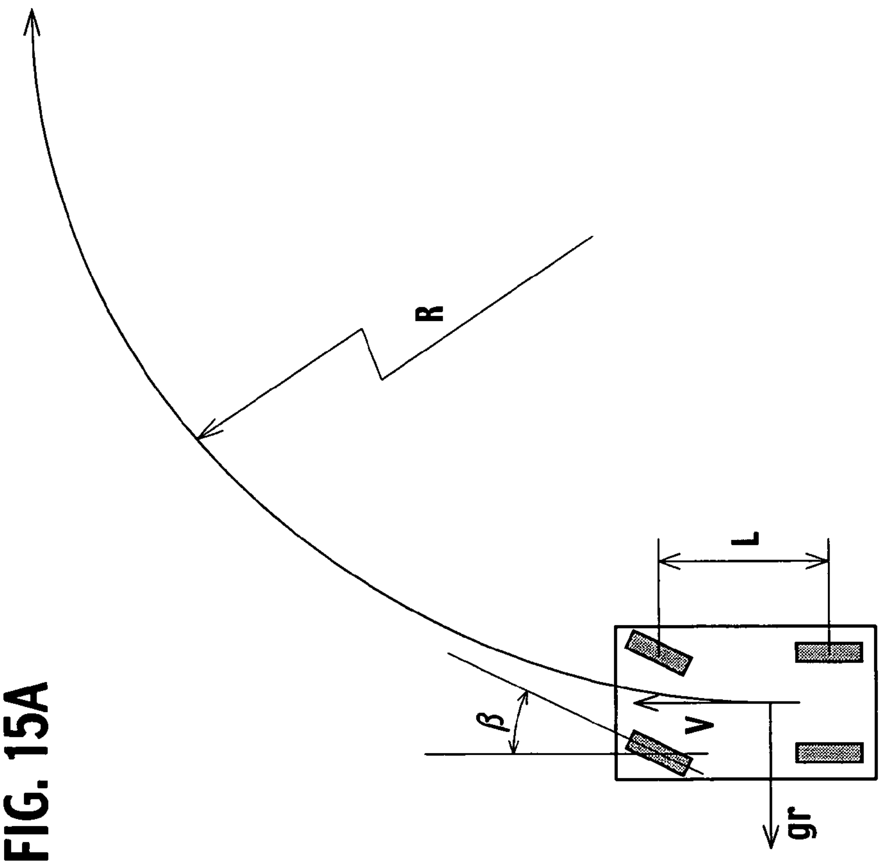
FIGS. 15A and 15B are views for explaining a positional variation of the visual stimulus in response to a steering angle of front wheels, wheelbase, vehicle speed, gravitational acceleration and proportionality constant of the vehicle.
Figure 15B:
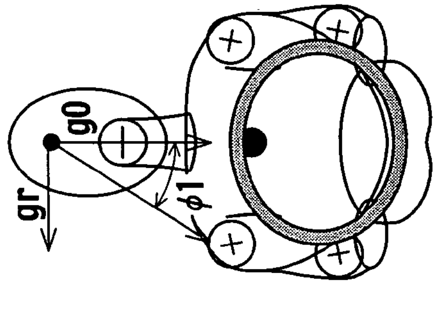

Note that a lateral acceleration gr applied to the driver at the time of turning is represented as the following Formula 3 based on the turning radius R (refer to FIG. 15A) and the vehicle speed V. Moreover, the turning radius R is represented as the following Formula 4 based on a steering angle β of front wheels of the vehicle and a wheelbase L thereof. Hence, the lateral acceleration gr applied to the driver at the time of turning is represented as the following Formula 5 based on the steering angle β of the front wheels, the vehicle speed V and the wheel base L by assigning the Formula 4 to the Formula 3. Meanwhile, an angle ϕ1 (refer to FIG. 15B) made of the acceleration vector and a gravitational acceleration g0, which are applied to the driver, is represented as the following Formula 6 based on the gravitational acceleration g0 and the lateral acceleration gr.

$$Gr=V^2/R \quad \text{[Formula 3]}$$

$$R=L/\beta \quad \text{[Formula 4]}$$

$$Gr=\beta V^2/L \quad \text{[Formula 5]}$$

$$\phi 1=\mathrm{atan}(Gr/Go) \quad \text{[Formula 6]}$$

Hence, the angle $\phi 1$ is represented as the following Formula 7 based on the steering angle $\beta$ (=steering angle $\theta$/steering gear ratio n) of the front wheels of the vehicle concerned, the wheel base L thereof, the vehicle speed V and the gravitational acceleration g0 by assigning the Formula 5 to the Formula 6. Then, an angular position variation $\phi$ of the visual stimulus is represented as the following Formula 8 when a proportionality constant is $\alpha$. Accordingly, the angular position variation $\phi$ of the visual stimulus may also be calculated by using the Formula 6 and the Formula 7. Note that, if the proportionality constant $\alpha$ is 1, the visual stimulus is varied in angle like a pendulum in a similar way to the angle variation of the vector of the acceleration applied to the driver. Moreover, if the proportionality constant $\alpha$ is within a range of $0<\alpha<1$, the angle variation becomes smaller than the angle variation of the vector of the acceleration applied to the driver. It is experimentally understood that, in general, the inclination range of the head of the driver owing to the turning is incorporated in the above-described range.

$$\phi 1 = \text{atan}\{(\beta \cdot V^2)/(L \cdot G)\} \quad \text{[Formula 7]}$$

$$\phi = \alpha\phi 1 \quad \text{[Formula 8]}$$

Figure 16A:
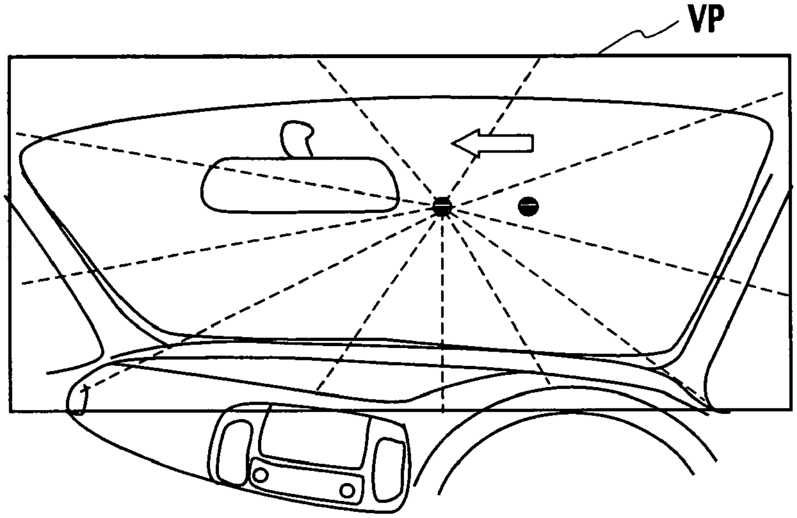
FIGS. 16A and 16B are views for explaining a configuration of a visual stimulus presented to the driver by a drive sense adjusting apparatus serving as a third embodiment of the present invention.
Figure 16B:
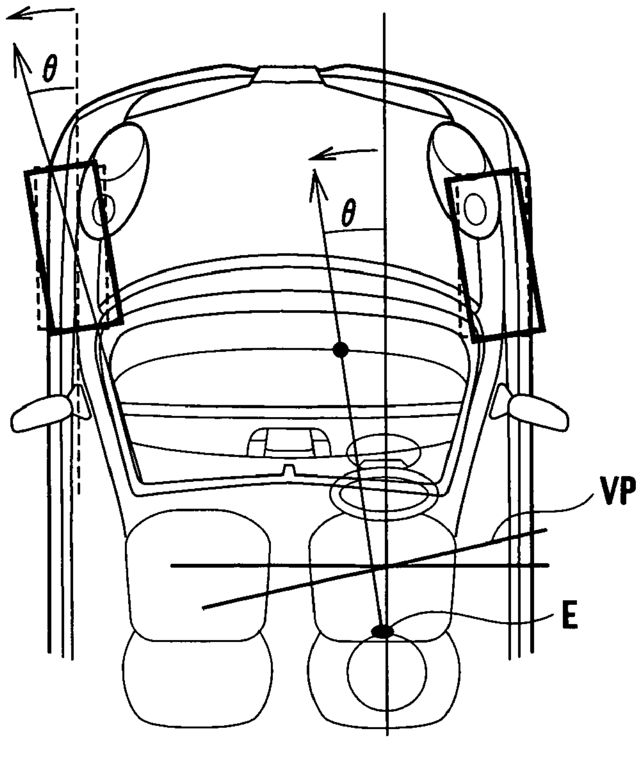
Figure 17:
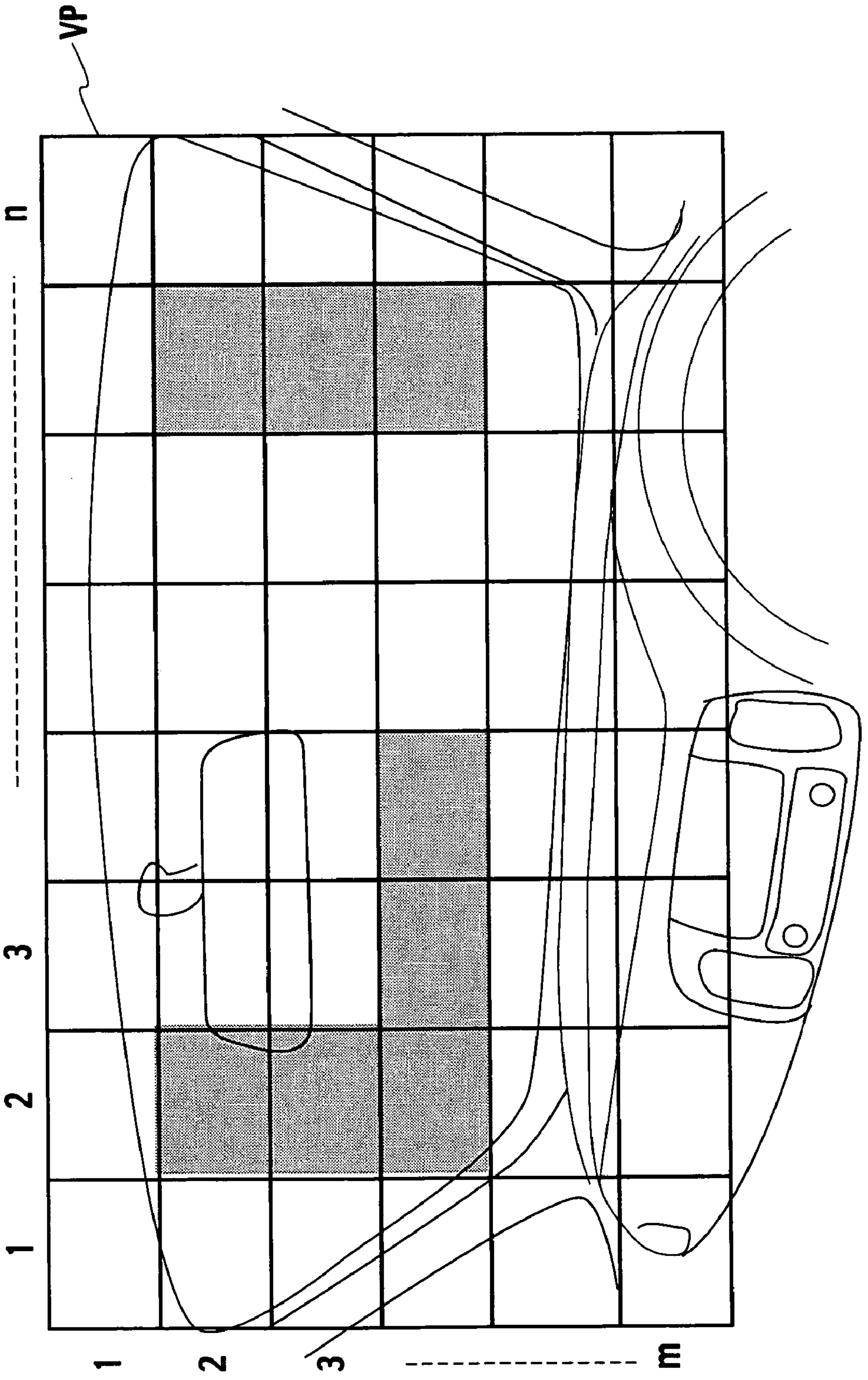
FIG. 17 is a view for explaining the configuration of the visual stimulus presented to the driver by the drive sense adjusting apparatus serving as the third embodiment of the present invention.
Figure 18A:
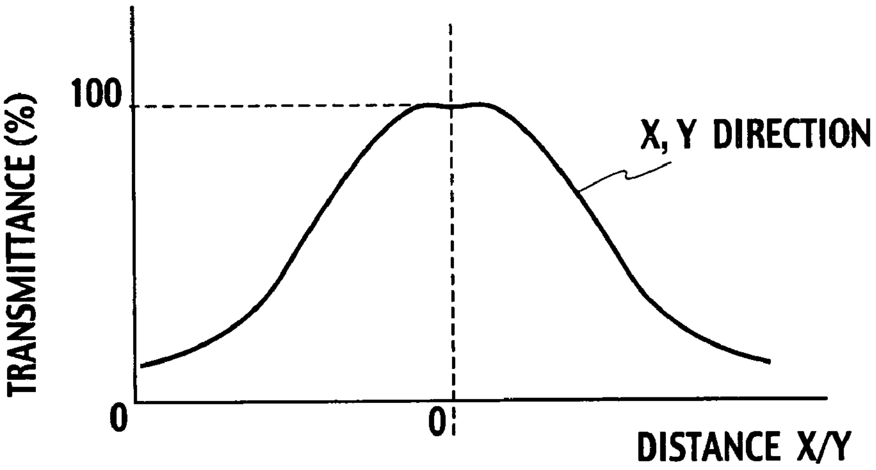
FIGS. 18A and 18B are views for explaining a configuration of a visual stimulus presented to the driver by a drive sense adjusting apparatus serving as a fourth embodiment of the present invention.
Figure 18B:
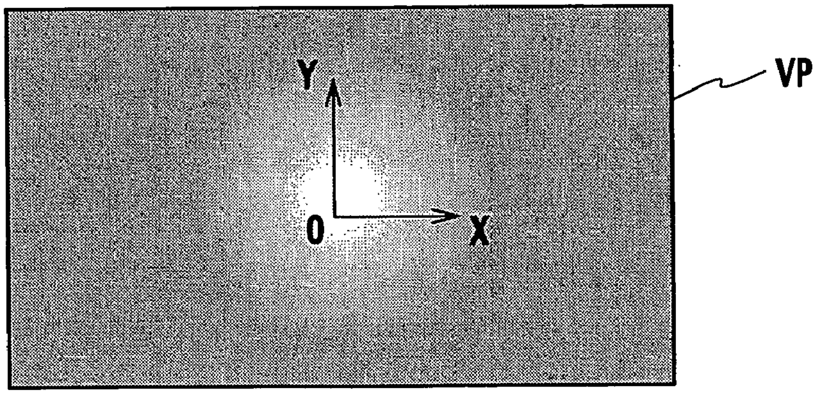
Figure 19A:
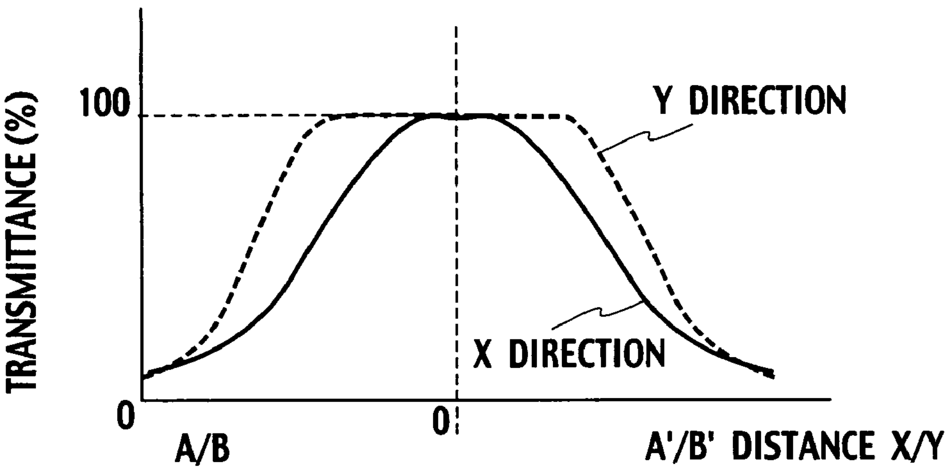
FIGS. 19A and 19B are views for explaining the configuration of the visual stimulus presented to the driver by the drive sense adjusting apparatus serving as the fourth embodiment of the present invention.
Figure 19B:
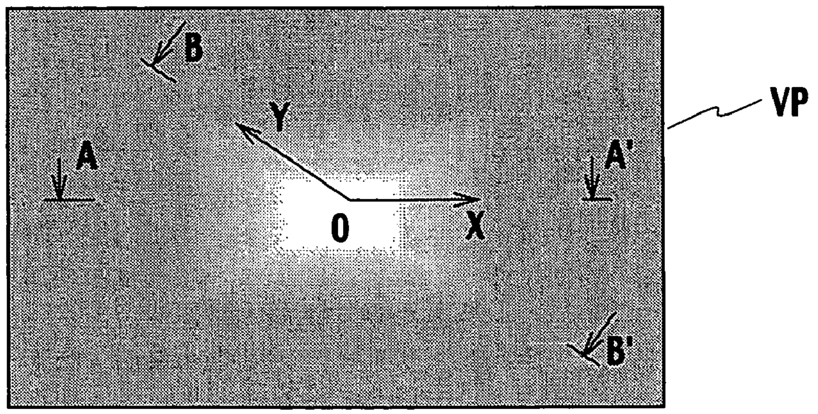

A drive sense adjusting apparatus serving as a third embodiment of the present invention has the same configuration as that of the drive sense adjusting apparatus serving as the first embodiment. The control unit 7: (1) as shown in FIGS. 16A and 16B, defines, as the virtual plane VP, a plane vertical to the steering angle $\theta$ with the eyeball position E of the driver taken as a center between the driver and the film 3; (2) as shown in FIG. 17, divides the virtual plane VP into plural regions; and (3) controls the visual stimulus to be projected to at least one region of the plural regions thus divided. Note that, though the virtual plane VP is divided into a lattice in the example shown in FIG. 17, the virtual plane VP may also be divided into other shapes.

With such a configuration as described above, the control unit 7 will present the visual stimulus only to a part of the region within the vision, and accordingly, the driver can be prevented from feeling trouble by the presentation of the visual stimulus, and in addition, a presented region effective in adjusting the heading perception can be set in response to the situation. Moreover, even if the film 3 is provided on a region having a curvature, such as the windscreen glass, the upper surface of the instrument panel and the front pillar portion, a visual stimulus free from distortion can be presented to the driver.

A drive sense adjusting apparatus serving as a fourth embodiment of the present invention has the same configuration as that of the drive sense adjusting apparatus serving as the third embodiment. When the horizontal direction and the vertical direction on the vertical plane VP with a point O thereon taken as a center is an X direction and a Y direction, respectively, the control unit 7 changes a transmittance of the visual stimulus in response to distances in the X direction and the Y direction. Specifically, as shown in FIGS. 18A and 18B and FIGS. 19A and 19B, the control unit 7 sets a circular or square region taking the point O as the center, and makes a transmittance of the visual stimulus within the region thus set higher than a transmittance of the visual stimulus in other regions.

With such a configuration as described above, the situation of the vehicle in the heading direction can be grasped through the portion where the transmittance of the visual stimulus is high, and accordingly, the visual stimulus presented to the driver can be prevented from inhibiting the driver's grasp of the situation in the heading direction. Note that the control unit 7 may change the region where the transmittance of the visual stimulus is to be changed in response to the driving scene. Alternatively, the control unit 7 may enhance transmittances of the vicinity of the focus of expansion F caused by the traveling of the vehicle and of the vicinities of the left and right pillars from which other objects such as a pedestrian may run into the vehicle. Moreover, in a similar way, the control unit 7 may change the transmittance of the visual stimulus in response to a depth direction Z.

Figure 20A:
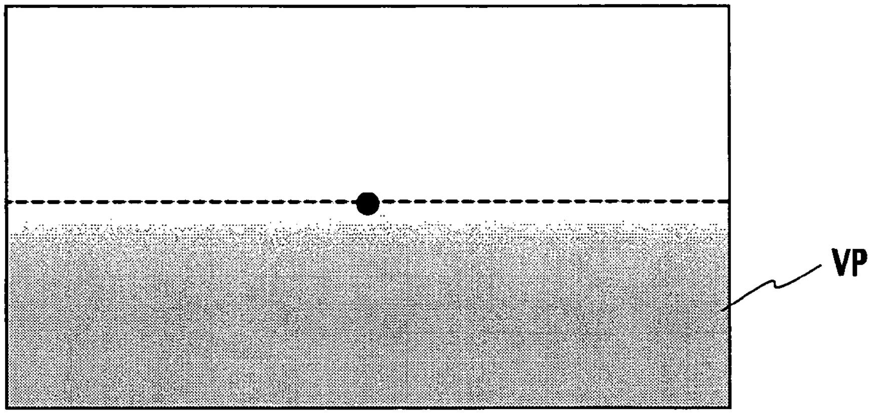
FIGS. 20A and 20B are views for explaining a configuration of a visual stimulus presented to the driver by a drive sense adjusting apparatus serving as a fifth embodiment of the present invention.
Figure 20B:
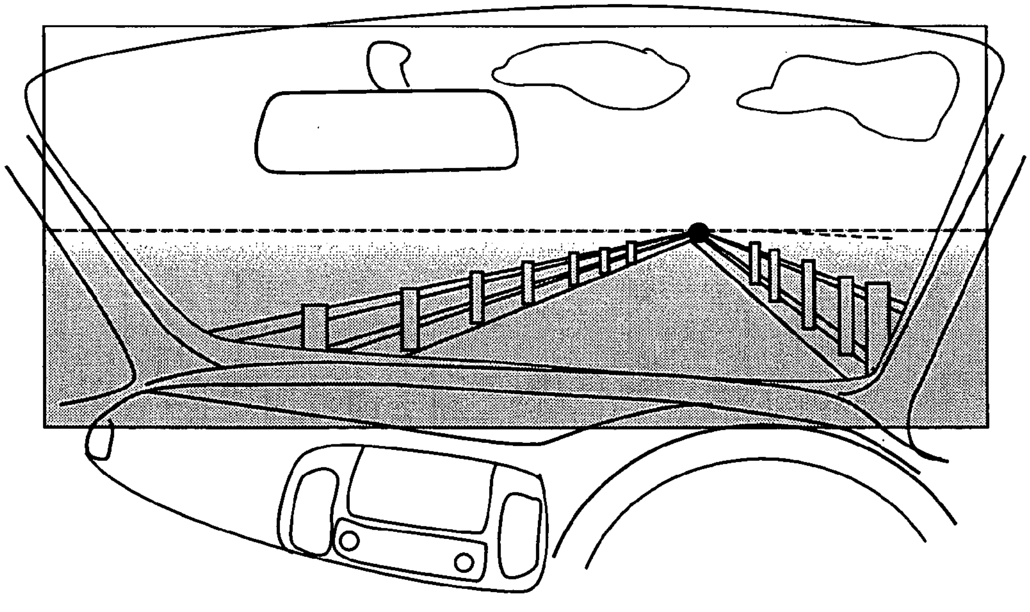

A drive sense adjusting apparatus serving as a fifth embodiment of the present invention has the same configuration as that of the drive sense adjusting apparatus serving as the third embodiment. As shown in FIGS. 20A and 20B, the control unit 7 divides the virtual plane VP into two regions in the horizontal direction, and presents the visual stimulus to be projected on only a lower region thus divided. In general, many visual stimuli inputted to the driver at the time of actual driving are composed of ones existing in a region below horizontal positions (global coordinate system) of a guardrail, a curb and the like. Many existing in a region above the horizontal positions are the sky, and clouds, mountains and the like which are located far away, and accordingly, visual stimuli generated therefrom are small. Hence, with such a configuration as described above, it is made possible to present a visual stimulus suitable for the actual running scene. Moreover, the size of the film 3 is reduced, and an irradiation range of the projector 2 can be narrowed, thus making it possible to reduce the cost of the drive sense adjusting apparatus.

Figure 21A:
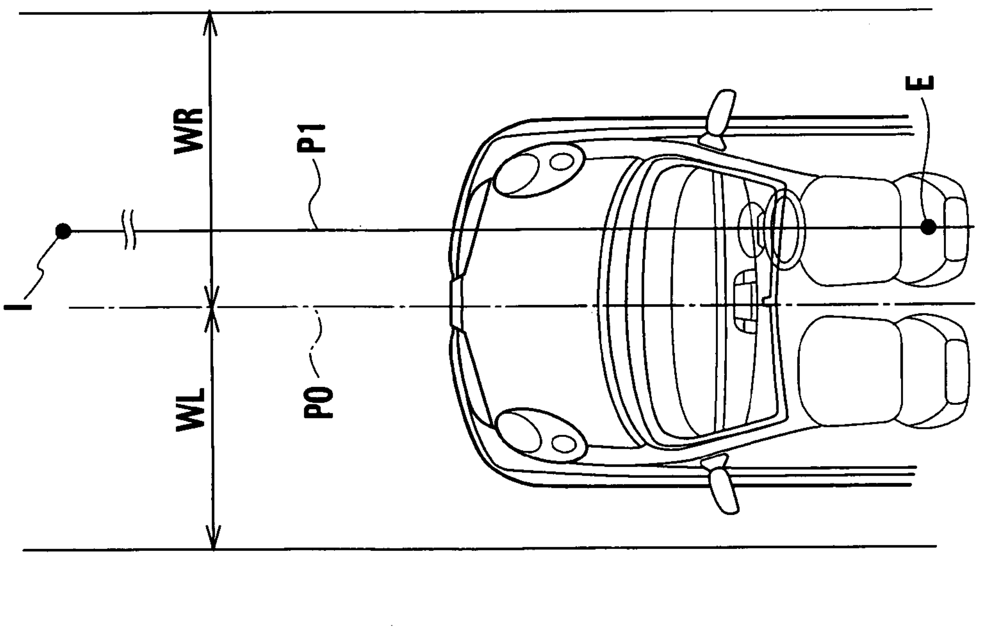
FIGS. 21A to 21C are views for explaining a configuration of a visual stimulus presented to the driver by a drive sense adjusting apparatus serving as a sixth embodiment of the present invention.
Figure 21B:
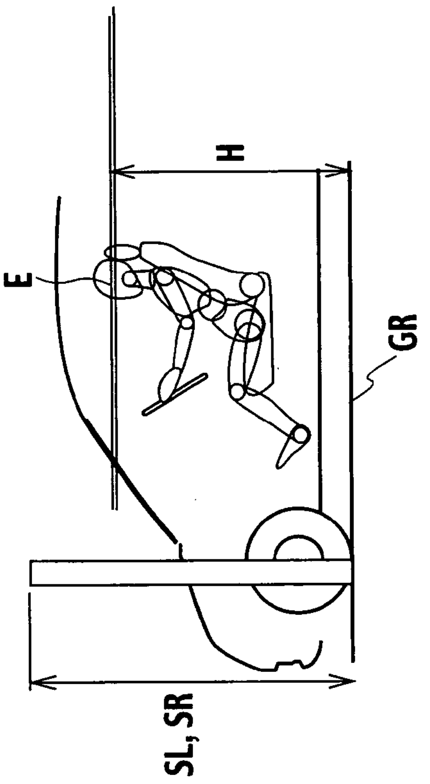

A drive sense adjusting apparatus serving as a sixth embodiment of the present invention has the same configuration as that of the drive sense adjusting apparatus serving as the third embodiment. The control unit 7 radially divides a display range of the visual stimulus. Specifically, in a state where the vehicle is going straight ahead on a road leading far away, such as a highway, as shown in FIGS. 21A and 21B, distances from a left lane and a right lane to the vehicle center P0 are denoted by WL and WR, respectively, the offset amount of the driver's seat center P1 with respect to the vehicle center P0 is denoted by D, and the sight height of the eyeball position E of the driver from the road surface GR is denoted by H. Then, the control unit 7 calculates angles $\theta L1$ and $\theta R1$ of divided lines on left and right sides between the road surface portion and the outsides of the lanes based on the following Formulae 9 and 10, and divides the virtual plane VP by the calculated angles $\theta L1$ and $\theta R1$ (refer to FIG. 21C). Note that the offset amount D is regarded as positive in the case where the driver's seat center P1 is offset in the right direction with respect to the vehicle center P0.

$$\theta R1 = \tan^{-1}\{(WL+D)/h\} \quad \text{[Formula 9]}$$

$$\theta L1 = \tan^{-1}\{(WR-D)/h\} \quad \text{[Formula 10]}$$

Figure 21C:
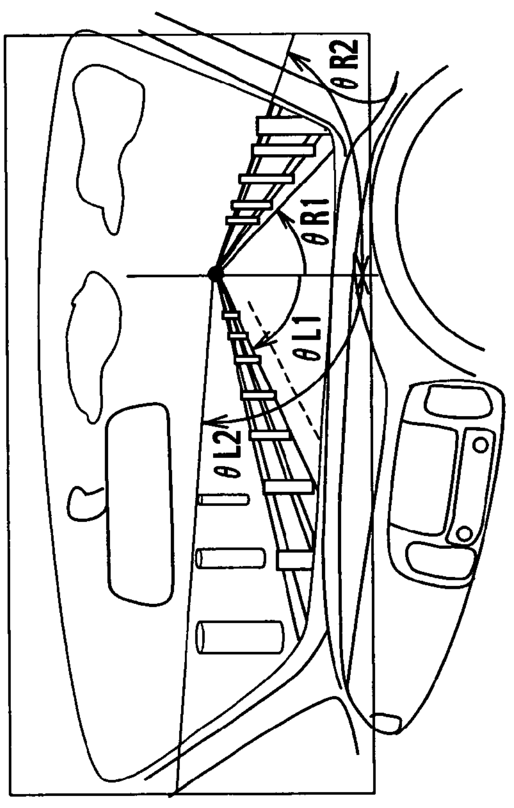

Furthermore, assuming structure heights on the left and right sides as SL and SR, respectively, the control unit 7 calculates angles $\theta L2$ and $\theta R2$ of left and right divided lines between the road surface portion and the structure based on the following formulae 11 and 12, and divides the virtual plane VP by the calculated angles $\theta L1$ and $\theta R1$ (refer to FIG. 21C).

$$\theta L2 = \tan^{-1}\{(WL+D)/(h-SL)\} \quad \text{[Formula 12]}$$

$$\theta R2 = \tan^{-1}\{(WL-D)/(h-SR)\} \quad \text{[Formula 11]}$$

Figure 22A:
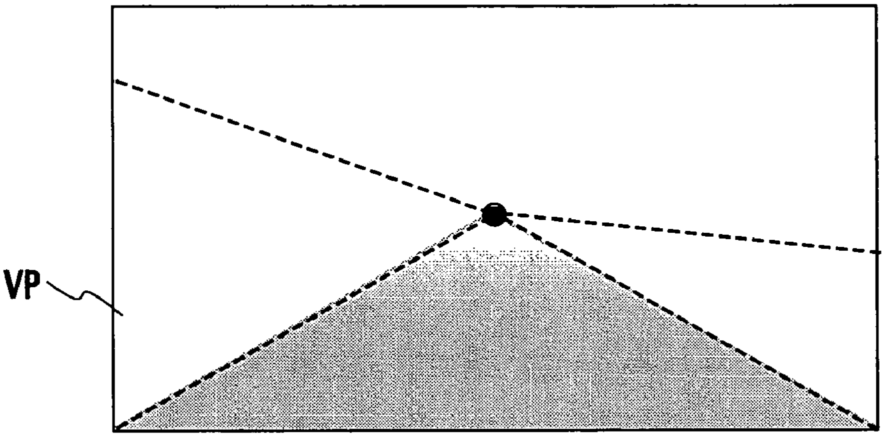
FIGS. 22A and 22B are views for explaining the configuration of the visual stimulus presented to the driver by the drive sense adjusting apparatus serving as the sixth embodiment of the present invention.
Figure 22B:
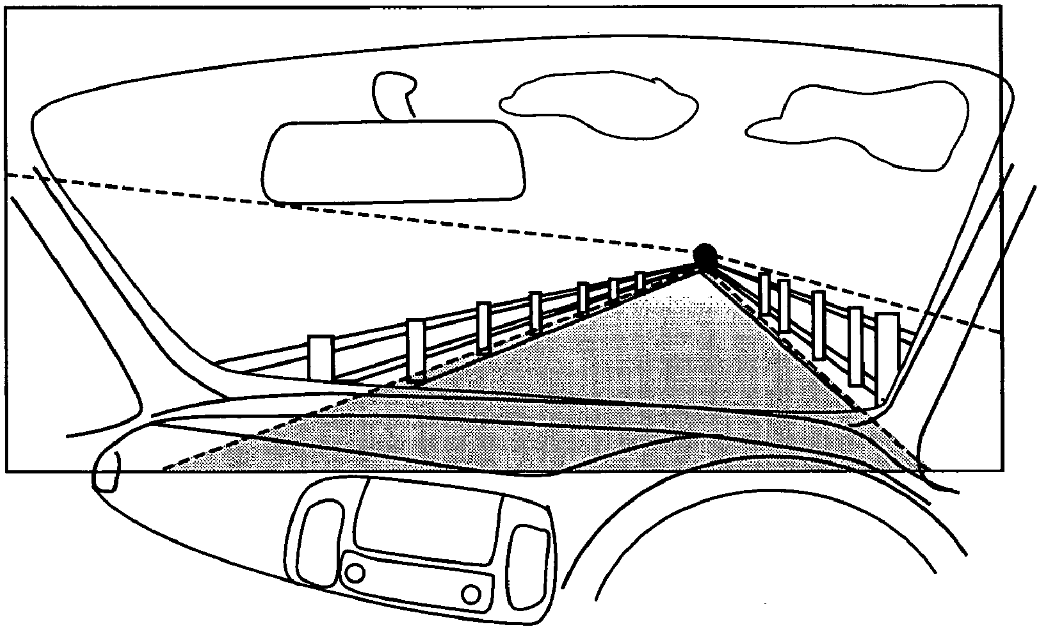
Figure 23A:
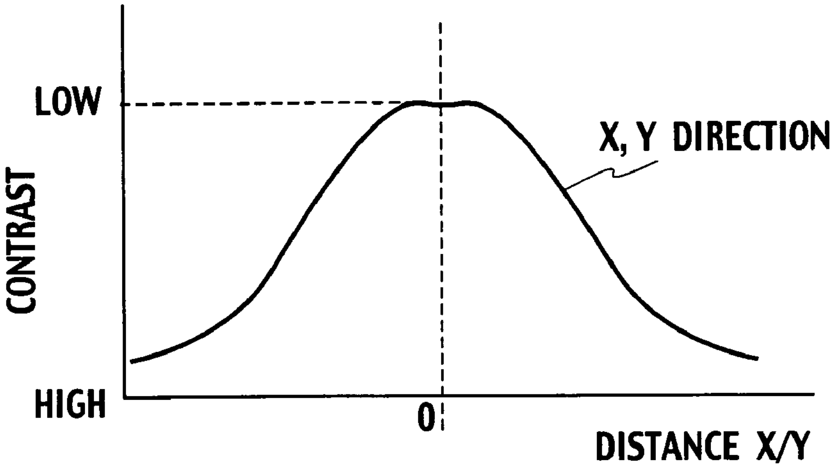
FIGS. 23A and 23B are views for explaining a configuration of a visuals stimulus presented to the driver by a drive sense adjusting apparatus serving as a seventh embodiment of the present invention.
Figure 23B:
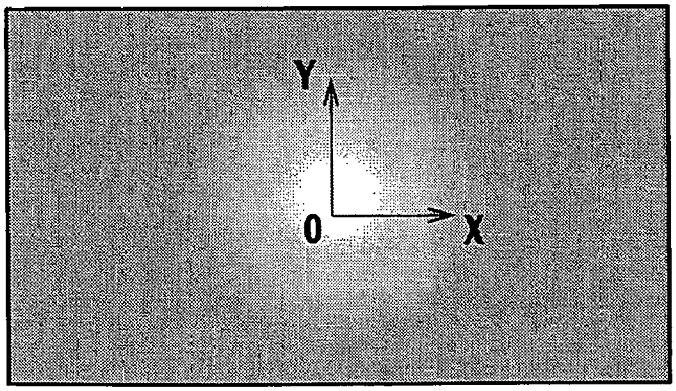
Figure 24A:
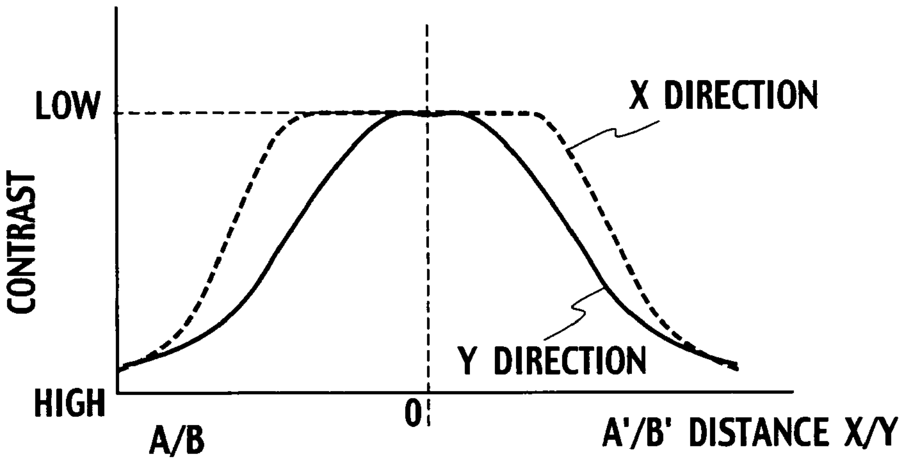
FIGS. 24A and 24B are views for explaining the configuration of the visual stimulus presented to the driver by the drive sense adjusting apparatus serving as the seventh embodiment of the present invention.
Figure 24B:
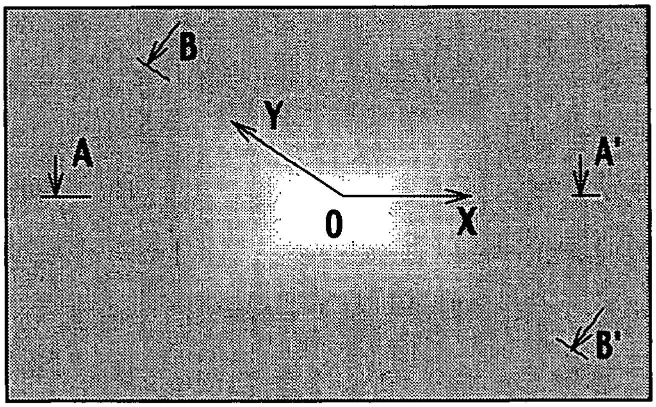

Then, as shown in FIGS. 22A and 22B, the control unit 7 controls the visual stimulus to be projected on at least one region radially divided in response to the running condition.

Note that, though a single lane is assumed in the above-described division example, it is preferable, in the case of determining the dividing position of the display range, to set the actual running condition in consideration of the vehicle position on the running lane in plural lanes. Specifically, when it is assumed that the sight height H of the driver is 1.4 [m], that the distances WL and WR from the left and right lanes to the vehicle center P0 are 2 and 1.5 [m], respectively, and that the offset amount D of the driver's seat center P1 with respect to the vehicle center P0 is 0.4 [m], then the division angles θL1 and θR1 becomes 59.7 and 38.2 [degree], respectively. In the vehicle in which the driver is offset to the right side with respect to the vehicle center P0, the left division angle becomes larger than the right division angle. Furthermore, when the other conditions are calculated by using the above-described numeric values with both of the left and right structure heights defined as 1 [m], the division angles θL2 and θR2 become 88 and 70 [degree], respectively. In the vehicle in which the driver is offset to the right side with respect to the vehicle center P0, the left division angle becomes larger than the right division angle also with regard to the structure portion.

Moreover, as described above, the respective divided regions differ depending on the running condition, and with regard to the left and right divided regions, the left and right structure heights SL and SR are increased by buildings and the like when the vehicle runs at an urban area, and accordingly, the display range is enlarged. Moreover, in a country regulating that the vehicle runs on the left side, a pavement is on the left side, and an oncoming car runs on the right side, and accordingly, a right-side flow is increased. Hence, in such a case, it is desirable to allocate a visual stimulus obtained by a self-motion to the right side so that left and right flows can be made even.

As apparent from the above description, according to the drive sense adjusting apparatus serving as the sixth embodiment of the present invention, when the control unit 7 radially divides the virtual plane with the vehicle heading direction taken as the center, and projects the visual stimulus onto the virtual plane VP, the control unit 7 controls the visual stimulus in response to the running direction to be projected on at least one regions radially divided. Accordingly, a visual stimulus more in touch with an actual instance can be presented in response to the outside scene and the drive condition.

A drive sense adjusting apparatus serving as a seventh embodiment of the present invention has the same configuration as those of the drive sense adjusting apparatuses serving as the first to sixth embodiments. The control unit 7 controls the visual stimulus so that a contrast of an element of the visual stimulus gets weaker as the element approaches the virtual spot (a center position of the virtual plane in this case). With such a configuration as described above, the driver perceives the virtual spot like being located far away by means of the aerial perspective as one of depth perception phenomena, and accordingly, a natural visual stimulus approximate to the actual scene is presented, thus making it possible to prevent the driver from feeling trouble over the visual stimulus. Moreover, according to the aerial perspective, as the element of the visual stimulus approaches the virtual spot, a bluing effect of the color thereof is increased, brightness thereof is lowered, and a density thereof is enhanced, thus also making it possible to obtain a similar effect. Furthermore, the control unit 7 may vary the contrast in response to the depth direction Z by a similar method.

A drive sense adjusting apparatus serving as an eighth embodiment of the present invention includes a sensor for detecting light quantities outside the vehicle and inside the cabin in addition to the configurations of the drive sense adjusting apparatuses serving as the first to seventh embodiments. The control unit 7 varies at least one of the brightness, contrast, color, density and opacity of the visual stimulus in response to the light quantities outside the vehicle and inside the cabin. In general, the external light is always varied at the time of driving the vehicle, and accordingly, the case is conceived, where the driver cannot recognize the visual stimulus. Hence, with such a configuration as described above, it is made possible for the driver to recognize the visual stimulus in any running scene.

A drive sense adjusting apparatus serving as a ninth embodiment of the present invention has the same configuration as those of the drive sense adjusting apparatuses serving as the first to eighth embodiments. The vehicle status detection unit 5 detects the lateral acceleration of the vehicle. Then, when the variation of the lateral acceleration during a time Δt is a predetermined value or more, the control unit 7 determines that there is a lurch in the heading direction of the vehicle, estimates the heading direction of the vehicle based on the steering angle during the time Δt, and presents the visual stimulus from the virtual spot fixed to the global coordinate system. Note that the control unit 7 may also determine the lurch of the vehicle based on the pitching, the rolling, the yawing, the acceleration G, the vehicle speed, the roll angle, the steering angle, the steering angle speed and the like. Then, with such a configuration as described above, the lurch of the vehicle can be corrected by the visual stimulus, and accordingly, the unstableness felt by the driver owing to the lurch can be reduced.

A drive sense adjusting apparatus serving as a tenth embodiment of the present invention has the same configuration as those of the drive sense adjusting apparatuses serving as the first to ninth embodiments. The driving environment detection unit 4 detects whether or not a wiper arm is operated. Then, when the wiper arm is operated, the control unit 7 determines that the heading direction of the vehicle is obscure, and presents the visual stimulus. Note that the control unit 7 may also determine that the heading direction of the driver is obscure in the case of having detected that it is raining by means of a raindrop sensor and in response to nature environments such as fogging, snowing and a sandstorm. Moreover, the control unit 7 may also make the above-described determination by measuring a motion of an external structure based on an image imaged by an external camera provided on the vehicle. Then, with such a configuration as described above, even if the heading direction of the vehicle is obscure for the driver, the driver can grasp the heading direction of the vehicle by means of the visual stimulus.

A drive sense adjusting apparatus serving as an eleventh embodiment of the present invention has the same configuration as those of the drive sense adjusting apparatuses serving as the first to tenth embodiments. The driver status detection unit 6 detects the number of winks of the driver and the motion of the eyeball thereof. Then, when the number of winks reaches a fixed value or more, the control unit 7 determines that an arousal state of the driver is low, and presents the visual stimulus so that the driver cannot lose sight of the heading direction. Moreover, based on the motion of the eyeball, the control unit 7 determines that the driver is looking aside while driving when a moving quantity of the sight with respect to the heading direction is large, and a pause thereof is 0.2 [second] or more. Then, the control unit 7 presents the visual stimulus. With such a configuration as described above, even if the awareness of the driver is low, the driver can be allowed to grasp the heading direction more, and to increase the awareness to the heading direction.

As a method of adjusting the drive sense of the driver, thereby stabilizing the drive sense of the driver, conceived is a method of disposing a window (frame) penetrating the vehicle body within the peripheral vision of the driver in the cabin, and presenting visually perceived information of the environment outside the vehicle, particularly, of the road optical flow through the window. However, it is not a realistic method to actually dispose the window as described above because such disposition affects the functional components of the vehicle. Note that, in order to solve such a problem, conceived is a method of imaging and presenting a video of the environment outside the vehicle, which is obstructed by the vehicle body and becomes a blindside from the driver, and correcting distortion of the imaged video outside the vehicle, thereby presenting a video outside the vehicle free from a feeling of wrongness to the vision of the driver.

However, in the case of simply presenting the video of the environment outside the vehicle, it is difficult for the driver to associate the video outside the vehicle and the scene outside the vehicle with each other owing to influences from a direction of an imaging device, transformation of the video outside the vehicle, an angle of view of the imaging device, the rolling (pitching) of the vehicle body and the like. Moreover, even if the video free from the feeling of wrongness is to be displayed for the vision of the driver by image processing, it takes time to perform the image processing, and accordingly, a shift occurs between a vehicle behavior by the drive operation and the video, and the video thus obtained cannot be effectively utilized as the visually perceived information of the road optical flow.

In this connection, with a configuration to be described below, a drive sense adjusting apparatus serving as a twelfth embodiment of the present invention facilitates the driver to associate the video outside the vehicle and the scene outside the vehicle with each other, thereby stabilizing the drive sense of the driver. Description will be made below of the drive sense adjusting apparatus serving as the twelfth embodiment of the present invention with reference to the drawings.

Figure 25A:
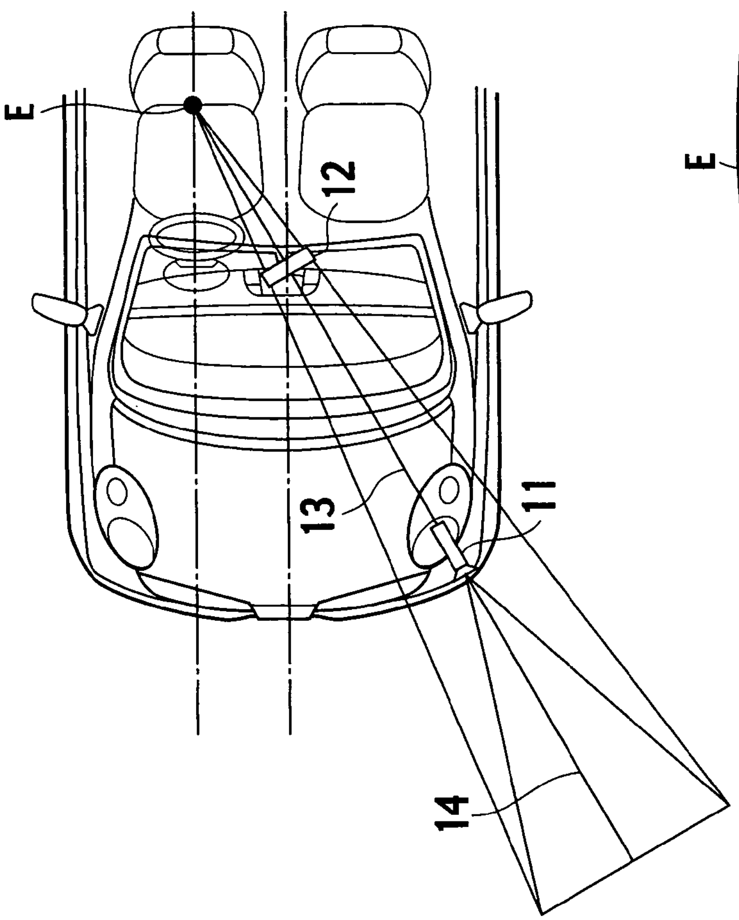
FIGS. 25A and 25B are schematic views showing a configuration of a drive sense adjusting apparatus serving as a twelfth embodiment of the present invention.
Figure 25B:
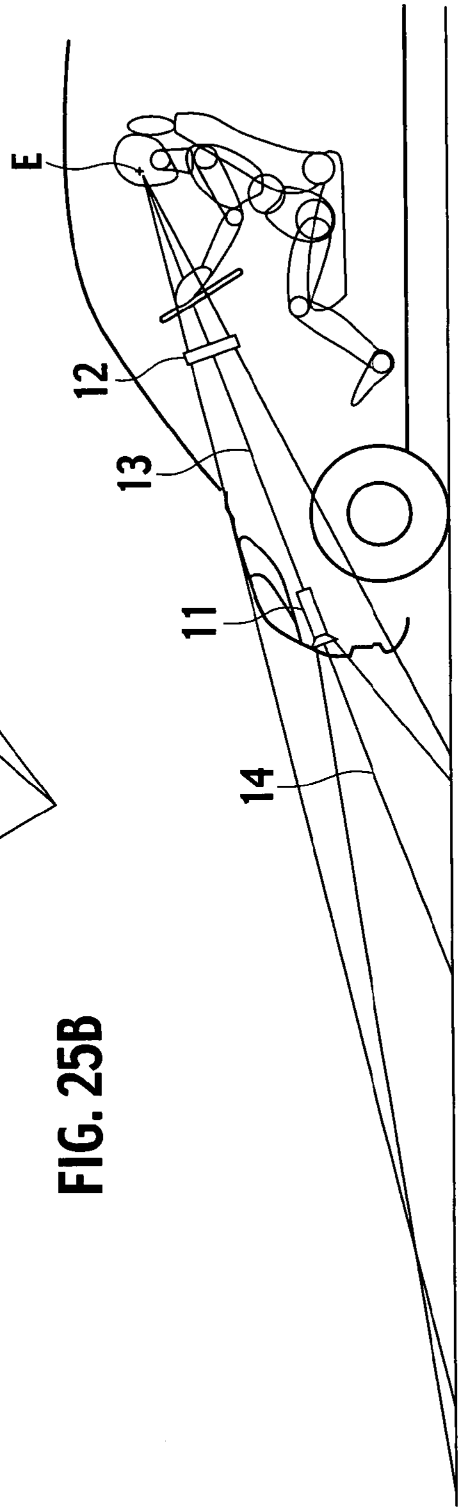

As shown in FIGS. 25A and 25B, the drive sense adjusting apparatus serving as the twelfth embodiment of the present invention includes an imaging device 11 for imaging the video outside the vehicle, and a visual stimulus display device 12 for displaying the video outside the image, which is imaged by the imaging device 11, as the visual stimulus. Moreover, the visual stimulus display device 12 is provided at a position inside the cabin, which is within the peripheral vision (refer to FIG. 7) with a viewing angle of the driver of 15 degrees or more at the time of driving, in particular, in the diagonal front or side on the passenger's seat side. A display screen of the visual stimulus display device 12 is disposed so that a straight line 13 connecting the eyeball position E of the driver and a center portion of the display screen to each other can be perpendicular to the display screen.

Moreover, the imaging device 11 is disposed at a position on a vertical plane including the straight line 13 or where an optical axis 14 thereof substantially coincides with a position of the straight line 13. With such a configuration as described above, a direction perpendicular to the screen of the visual stimulus display device 12 and a direction of the video outside the image can be made to substantially coincide with each other. Accordingly, when the driver visually recognizes the display screen, the video outside the vehicle on the display screen and the environment outside the vehicle are easily associated with each other, thus making it possible to stabilize the drive sense of the driver.

Figure 26B:
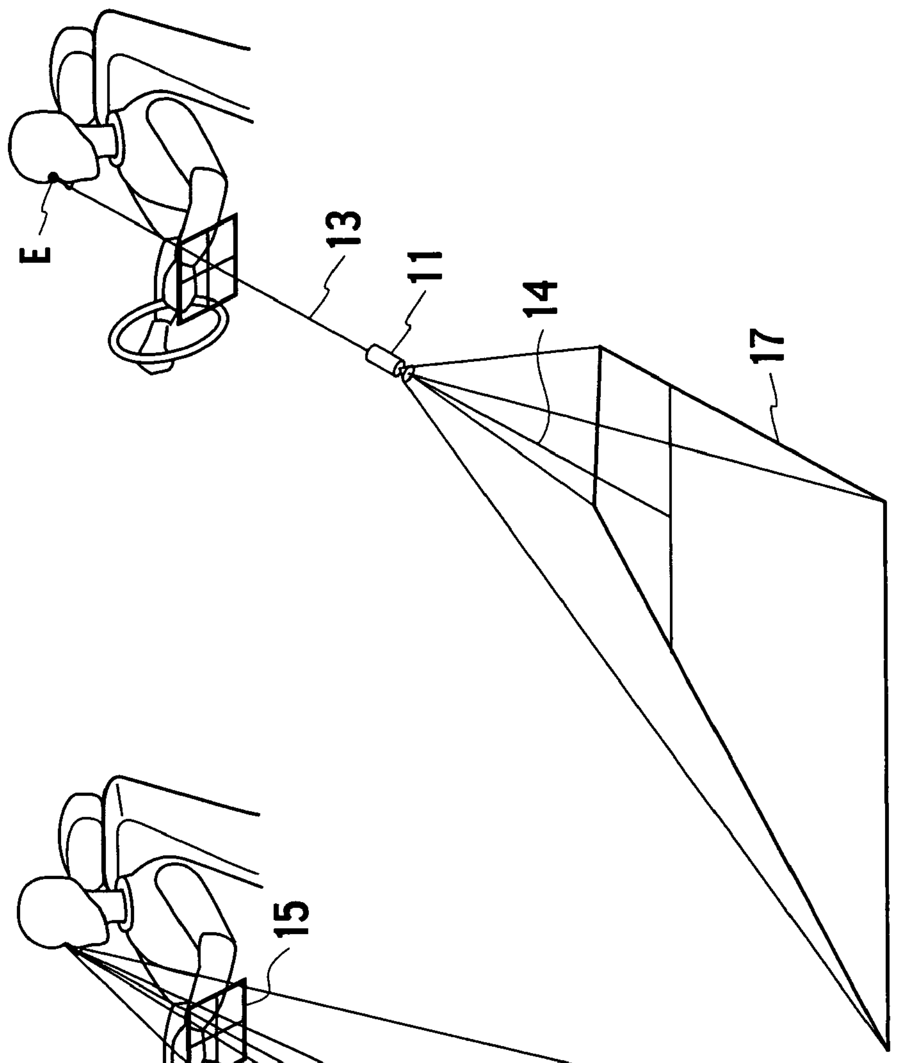
FIGS. 26A and 26B are a view showing a road range perceived by the driver when the driver views an environment outside the vehicle by a single-eye gaze or a both-eye periphery viewing through a virtual frame under the same disposition condition as that for a visual stimulus display device and having the same size as that thereof, and a view showing a road range imaged by an imaging device when a straight line connecting a viewpoint position of the driver and a center of a display screen of the visual stimulus display device to each other and an optical axis of the imaging device are made to coincide with each other, respectively.
Figure 26A:
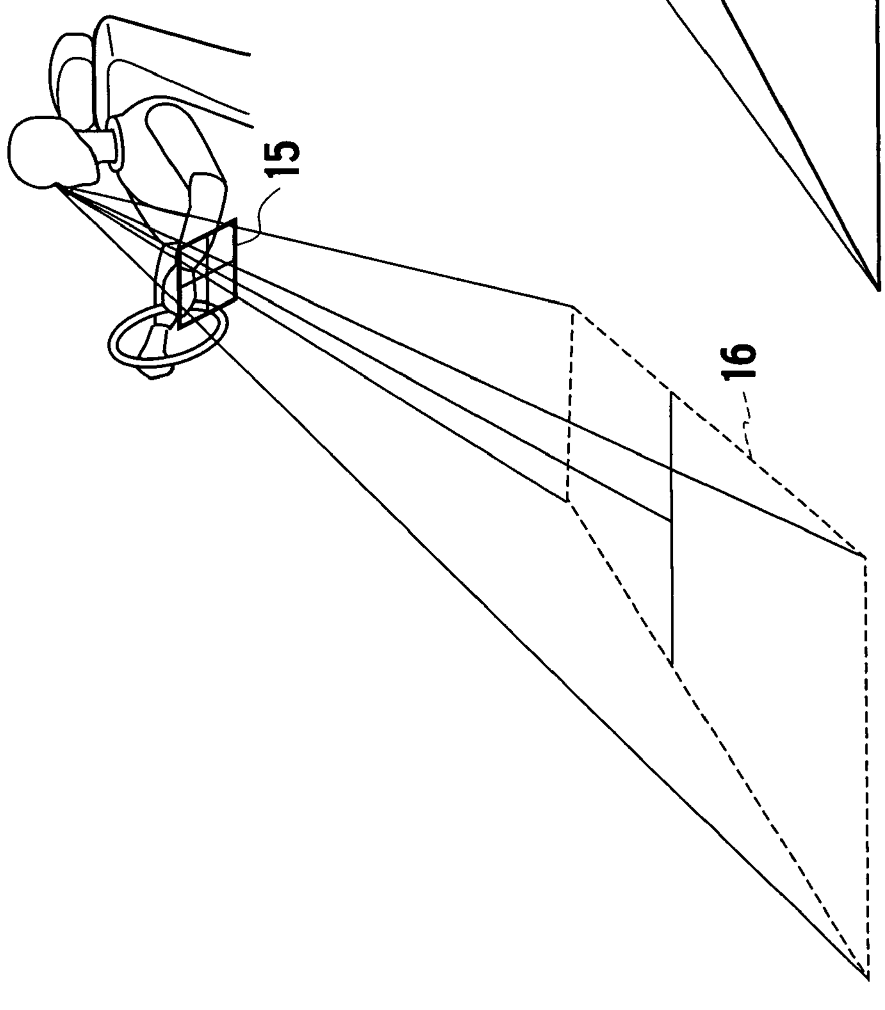
Figure 27:
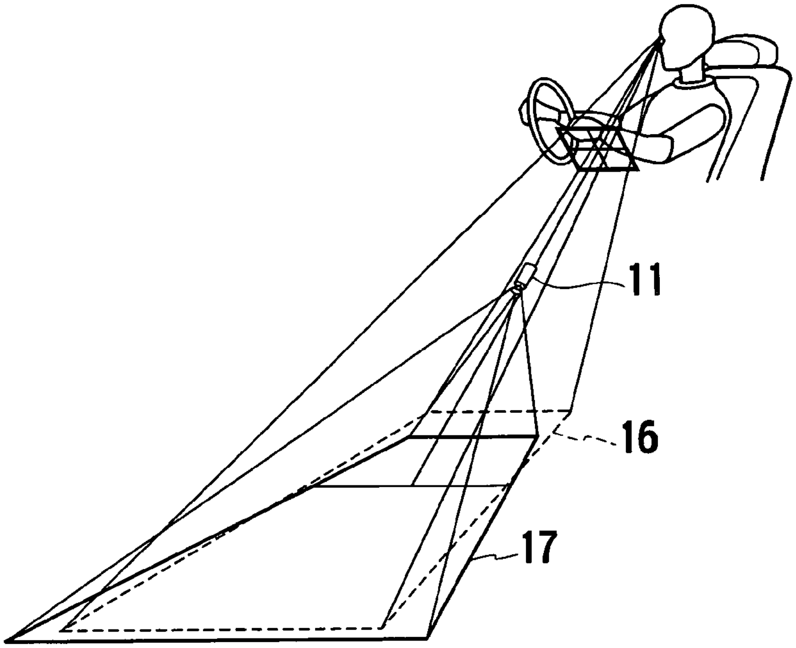
FIG. 27 is a view showing a difference between the first road range and the second road range, in which the first road range is perceived by the driver when the driver views the environment outside the vehicle by the single-eye gaze or the both-eye periphery viewing through the virtual frame under the same disposition condition as that for the visual stimulus display device and having the same size as that thereof, and the second road range is imaged by the imaging device when the straight line connecting the viewpoint position of the driver and the center of the display screen of the visual stimulus display device to each other and the optical axis of the imaging device are made to coincide with each other.

Note that, as shown in FIG. 26A, when a virtual frame 15 under the same disposition condition as that for the visual stimulus display device 12 and having the same size as that thereof is disposed, and the driver views the environment outside the vehicle through the frame 15 by a single-eye gaze or a both-eye periphery viewing, a road range perceived by the driver becomes as a dotted-line range 16. Meanwhile, as shown in FIG. 26B, when the straight line 13 connecting the eyeball position E of the driver and the center of the display screen of the visual stimulus display device 12 to each other and the optical axis 14 of the imaging device 11 are made to coincide with each other, the road range imaged by the imaging device 11 becomes as a solid-line range 17. Specifically, since distances to the road differ between the eyeball position E of the driver and the position of the imaging device 11, the road range 16 perceived by the driver when the driver views the environment outside the vehicle by the single-eye gaze or the both-eye periphery viewing and the road range 17 imaged by the imaging device 11 do not coincide with each other as shown in FIG. 27, and the road range 17 imaged by the imaging device 11 is distorted in comparison with the road range 16.

Figure 28:
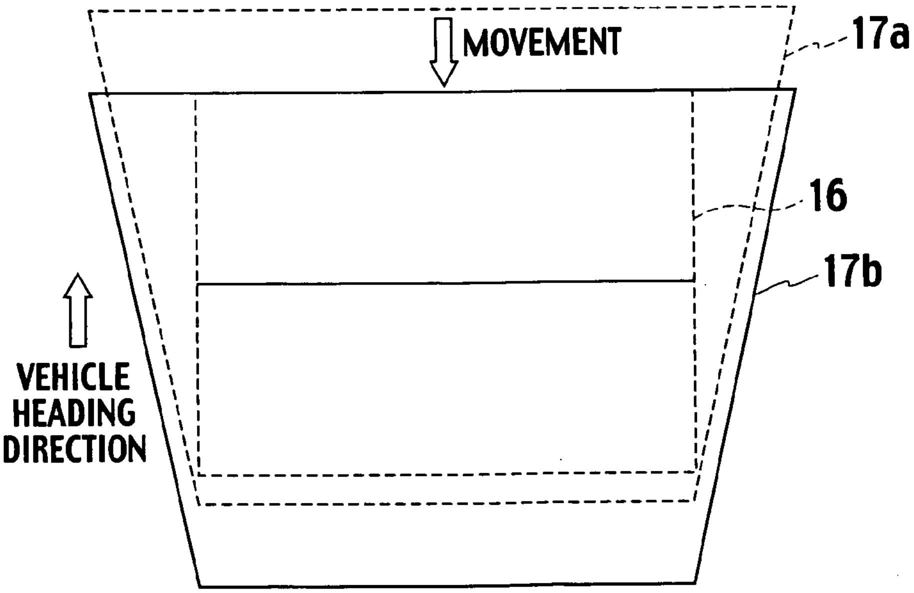
FIG. 28 is a view showing a modification example of the road range imaged by the imaging device when the straight line connecting the viewpoint position of the driver and the center of the display screen of the visual stimulus display device to each other and the optical axis of the imaging device are made to coincide with each other.

Hence, at an upper end portion of the visual stimulus display device 12 or an end portion of the visual stimulus display device 12, which is near the central vision when the driver gazes the heading direction, a function such as zooming of the imaging device 11 is used, image processing such as coordinate conversion is performed, and the disposition of the imaging device 11 or the visual stimulus display device 12 is adjusted on the vertical plane including the straight line 13 connecting the eyeball position E of the driver and the screen center of the visual stimulus display device 12 to each other or on an approximate straight line thereof. In such a way, as shown in FIG. 28, it is desirable to move a road range 17*a* imaged by the imaging device 11 to a road range 17*b* so that the upper end portion of the road range 16 can be made to substantially coincide with an upper end portion of the road range 17*a* or the upper end position of the display image near the central vision when the driver gazes the heading direction. Specifically, it is desirable that the driver visually recognize, as the same, directions of time variations of the video outside the vehicle and the environment outside the vehicle at the upper end portion of the visual stimulus display device 12 or the end portion of the visual stimulus display device 12, which is near the central vision when the driver gazes the heading direction.

Figure 29:
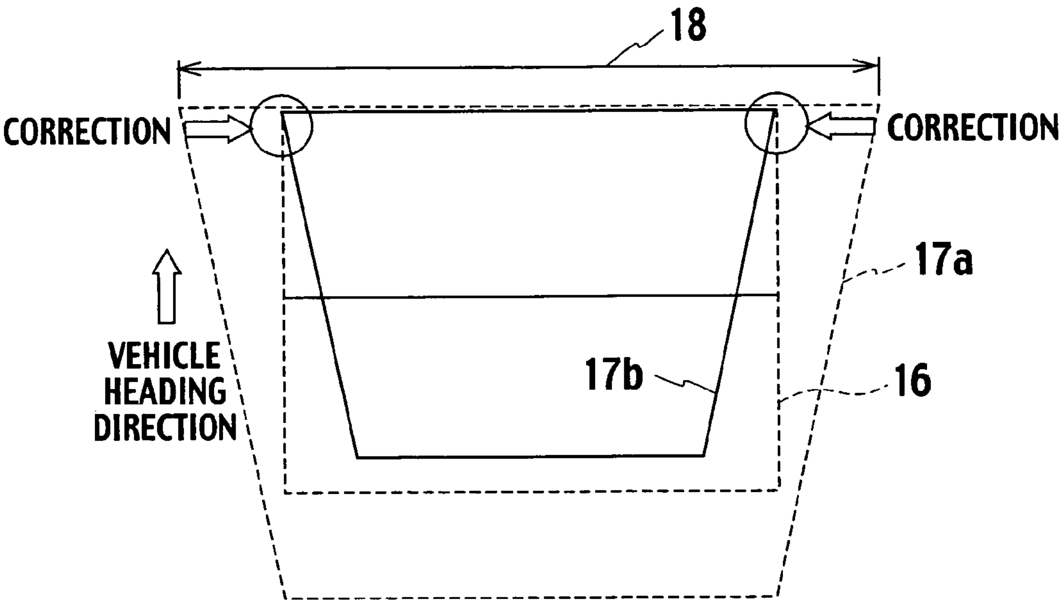
FIG. 29 is a view showing a modification example of the road range imaged by the imaging device when the straight line connecting the viewpoint position of the driver and the center of the display screen of the visual stimulus display device to each other and the optical axis of the imaging device are made to coincide with each other.

Moreover, at the upper end portion of the visual stimulus display device 12 or the end portion of the visual stimulus display device 12, which is near the central vision when the driver gazes the heading direction, the function such as zooming of the imaging device 12 is used, image processing such as cut-out of the image is performed, a wide lens is used, and the disposition of the imaging device 11 or the visual stimulus display device 12 is adjusted on the vertical plane including the straight line 13 connecting the eyeball position E of the driver and the screen center of the visual stimulus display device 12 to each other or on the approximate straight line thereof. In such a way, as shown in FIG. 29, the road range 17*a* may be corrected to the road range 17*b* so that the size or angle of view 18 of the road range 17*a* and the size or angle of view of the road range 16 can be made substantially coincide with each other. Specifically, at the upper end portion of the visual stimulus display device 12 or the end portion of the visual stimulus display device 12, which is near the central vision when the driver gazes the heading direction, it is desirable that the driver visually recognize, as the same, depth perceptions of the video outside the vehicle and the environment outside the vehicle, in other words, moving speeds (temporal moving quantities) of the video outside the vehicle and the environment outside the vehicle.

Figure 30:
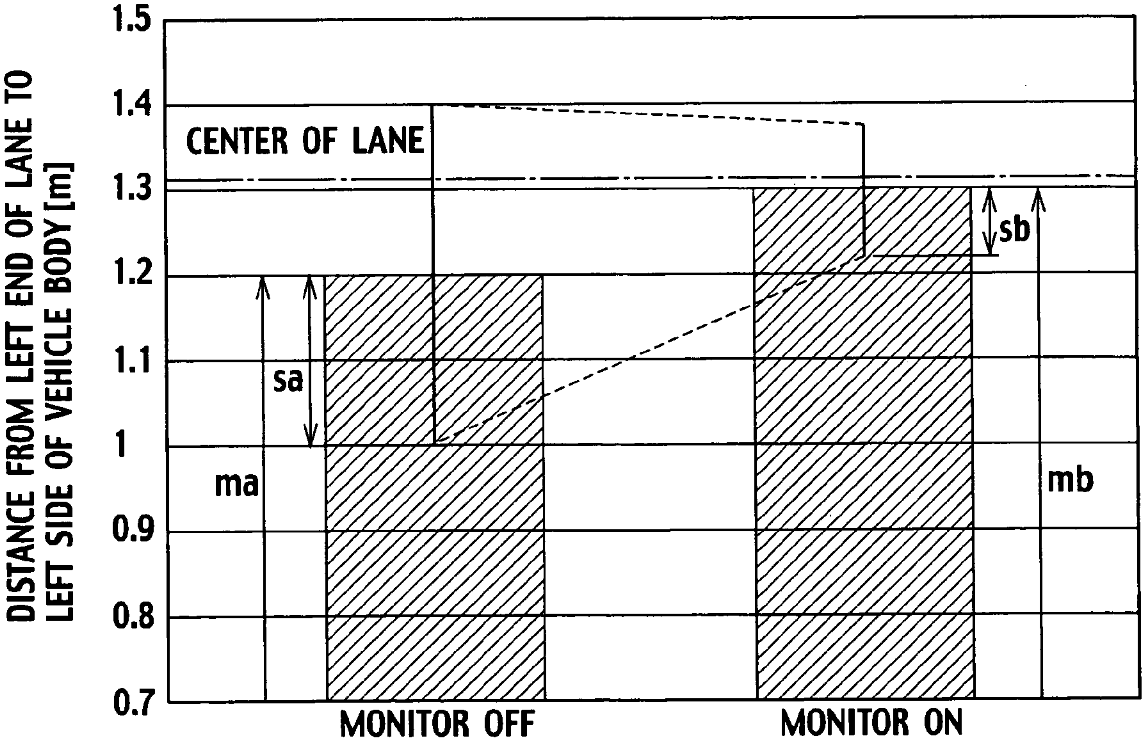
FIG. 30 is a view showing mean values and variations of a self-vehicle position in cases of presenting the visual stimulus to the driver and not presenting the visual stimulus thereto.

With such a configuration as described above, even if the entire video outside the vehicle does not completely coincide with the environment outside the vehicle, the driver visually recognizes the video outside the vehicle by the single-eye gaze or the both-eye periphery viewing, thus making it possible to perceive the motion direction continuing with the road optical flow viewed through the front window freely from the feeling of wrongness. Moreover, the heading perception of the self motion straight ahead is facilitated based on the motion direction of the entire optical flow in which an area is increased. Note that investigation was performed for precisions of self-vehicle positions in a lane (lane keeping) when the driver is instructed to keep a center of the lane to actually drive the vehicle on a straight road both in a case of presenting the visual stimulus to the driver and a case of not presenting the same. As a result, as shown in FIG. 30, a mean value mb of the self-vehicle position in the case of presenting the visual stimulus to the driver got closer to the center of the lane than a mean value ma of the self-vehicle position in the case of not presenting the visual stimulus. Moreover, a variation sb of the self-vehicle position in the case of presenting the visual stimulus to the driver was reduced to approximately one-third of a variation sa in the case of not presenting the visual stimulus. From the above, it is understood that the precision of the self-vehicle position in a lane on the straight road is improved by presenting the visual stimulus.

Note that, though not shown in the drawing, in the case of running on a curved road in the above-described experiment, it was found that the head posture of the driver during the turning is stabilized by presenting the visual stimulus. Moreover, the above-described experiment was performed by adjusting the displayed image in such a manner that a micro color camera (f=7.5 mm) as the imaging device 11 was attached onto a left side of a front bumper of the vehicle, a liquid crystal monitor (10.5 inches) as the visual stimulus display device 12 was disposed in the vicinity of a dashboard at the center of the vehicle width, and the eyeball position E of the driver, a center of the monitor and an optical axis of the camera were disposed so as to be located on an approximate straight line.

Figure 31A:
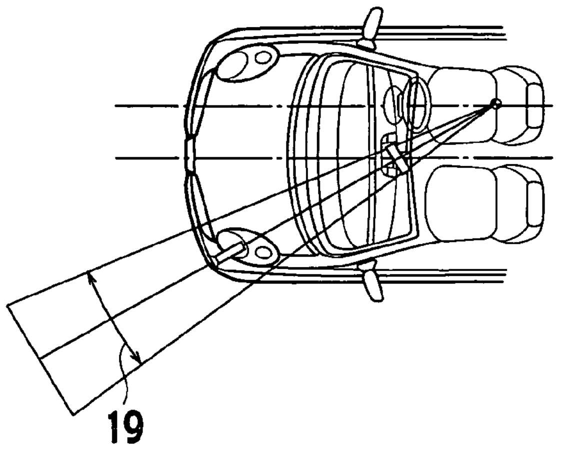
FIGS. 31A and 31B are views showing a viewing angle of the driver when the driver performs the single-eye gaze or the both-eye periphery viewing, and showing a viewing angle of the driver when the driver makes a visual recognition by both eyes while facing just right ahead to the visual stimulus display device, respectively.
Figure 31B:
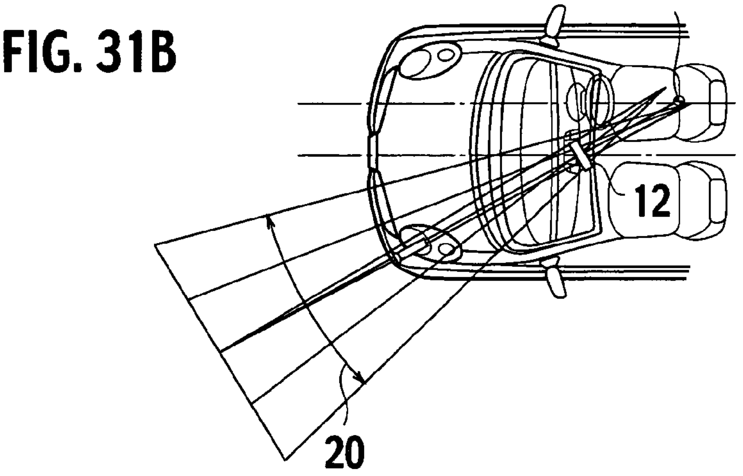
Figure 32:
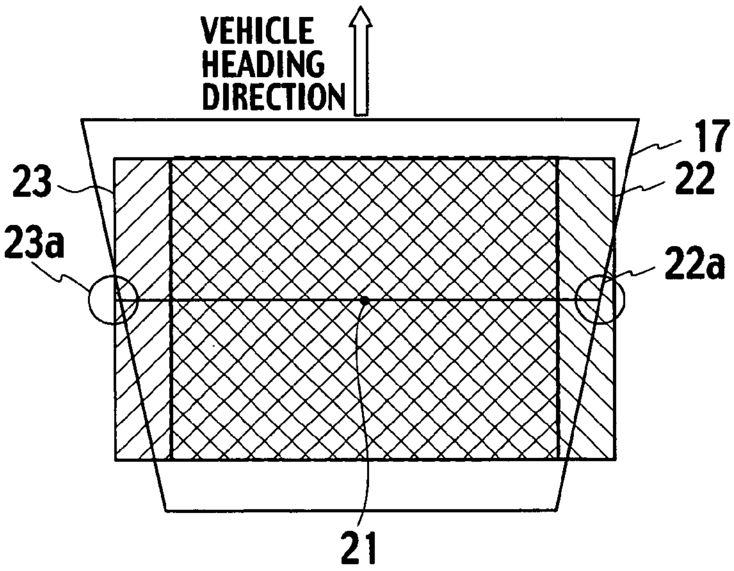
FIG. 32 is a view showing a modification example of the road range imaged by the imaging device when the straight line connecting the viewpoint position of the driver and the center of the display screen of the visual stimulus display device to each other and the optical axis of the imaging device are made to coincide with each other.

Moreover, as shown in FIGS. 31A and 31B, a viewing angle 19 in the case where the driver performs the single-eye gaze or the both-eye periphery viewing and a viewing angle 20 in the case where the driver makes a visual recognition by both eyes while facing just right ahead to the visual stimulus display device 12 differ from each other. The viewing angle gets wider in the case where the driver makes the visual recognition by both eyes while facing just right ahead to the visual stimulus display device 12. Moreover, it is known that, when the visual recognition is made by both eyes, the driver gazes the vicinity of a center 21 of a displayed image shown in FIG. 32, and at a position thereof, visually perceives the depth perception and the like.

Accordingly, the function such as zooming of the imaging device 11 is used, the image processing such as the coordinate conversion is performed, the wide lens is used, and the disposition of the imaging device 11 or the visual stimulus display device 12 is adjusted on the vertical plane including the straight line 13 connecting the eyeball position E of the driver and the screen center of the visual stimulus display device 12 to each other or on the approximate straight line thereof. In such a way, it is desirable to correct the road range 17 imaged by the imaging device 11 so that a horizontal angle of view at a vertical center of the road range 17 can be made to substantially coincide with a right end point 22*a* of a vertical center of a left-eye vision 22 and a left end point 23*a* of a vertical center of a right-eye vision 23. With such a configuration as described above, in the case of such both-eye gaze, the position, depth perception, depth direction, speed and the like of the environment outside the vehicle can be associated with those of the displayed image outside the vehicle at a center thereof.

Figure 33:
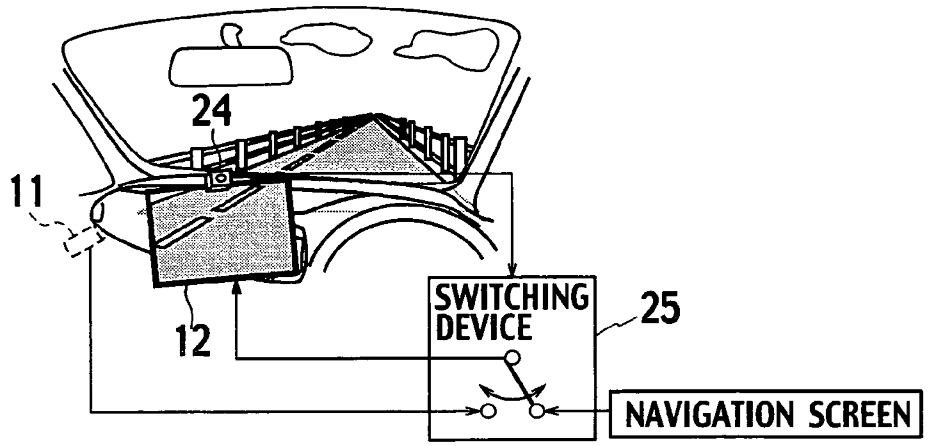
FIG. 33 is a schematic view showing a configuration of an application example of the drive sense adjusting apparatus serving as the twelfth embodiment.

Moreover, as shown in FIG. 33, a determination device 24 for determining which of the front and the visual stimulus display device 12 the driver is gazing is provided, and in response to a determination result of the determination device 24, a control is performed for a switching device 25 for switching screens to be displayed on the visual stimulus display device 12, switching between an image in which the difference between the viewing angles is corrected as described above and a displayed screen on a navigation system. In such a way, the image in which the difference between the viewing angles is corrected and the displayed screen on the navigation system may be displayed while being switched in response to a subject to be gazed by the driver. With such a configuration, a feeling of wrongness, which is accompanied with the difference between the viewing angles, can be reduced without correcting the difference between the viewing angles.

Note that, though the image displayed when the driver is gazing the visual stimulus display device 12 is the displayed screen on the navigation system in the example shown in FIG. 33, a displayed screen on an information presentation system other than the navigation system, such as a parking assistance system, or video media such as a television video and a movie may also be displayed. Moreover, no information may also be displayed by turning off the screen. Moreover, the determination device 24 measures the motion of the eye of the driver, senses the head posture of the driver, and measures a positional relationship between the visual stimulus display device 12 and the eye or head of the driver, thereby determining which of the front or the visual stimulus display device 12 the driver is gazing.

Figure 34:
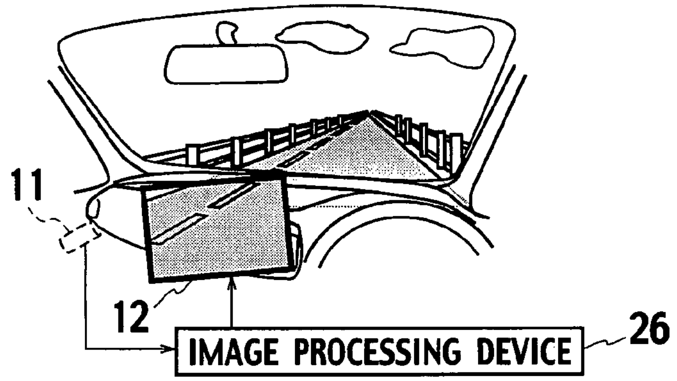
FIG. 34 is a schematic view showing a configuration of an application example of the drive sense adjusting apparatus serving as the twelfth embodiment.

Moreover, as shown in FIG. 34, a configuration to be described below may be adopted. An image processing device 26 is provided in the cabin. For example, the video imaged by the imaging device 11 is displayed according to a gray scale or binarized at a certain threshold value by the image processing device 26. An absolute value of a difference between two images outside the vehicle, which have been imaged with a specific time difference, is taken, thereby creating a difference image. Then, the created difference image is displayed as the visual stimulus on the visual stimulus display device 12. With such a configuration as described above, high-precision information in which importance is low is not displayed as the visual stimulus presented to the peripheral vision of the driver, and accordingly, the trouble to the driver is reduced, thus making it possible to restrict distraction of the driver. From a viewpoint of presenting the visually perceived information of the environment outside the vehicle, and particularly, of the road optical flow into the peripheral vision of the driver, no problem occurs if the displayed image is visually perceived to be continuous with the environment outside the vehicle even if the displayed image does not display the environment outside the vehicle with high precision. Note that image processing may be performed for the video imaged by the imaging device 11 by means of the image processing device 26 so as to display a portion where the variation of the contrast is large or not to display a portion where a spatial frequency is high, and thereafter, the video may be displayed on the visual stimulus display device 12. Moreover, the visual stimulus may be presented while changing a focus of the imaging device 11 or the visual stimulus display device 12.

Figure 35:
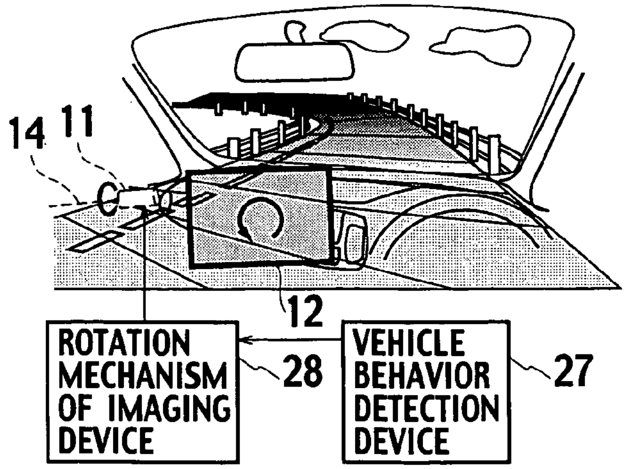
FIG. 35 is a schematic view showing a configuration of an application example of the drive sense adjusting apparatus serving as the twelfth embodiment.

Moreover, as shown in FIG. 35, a configuration to be described below may be adopted. An inclination angle of the vehicle with respect to the road is detected by a vehicle behavior detection device 27 based on a stroke of a suspension, and in response to the detected inclination angle, a rotation mechanism 28 for rotationally driving the imaging device 11 about the optical axis 14 is controlled to be driven. In such a way, a horizontal line in a road coordinate system in the displayed image and a horizontal line in an actual road coordinate system is made approximately parallel to each other. With such a configuration as described above, a disturbance in the equilibrium sense of the driver owing to an inconsistency between the horizontal line in the displayed image and the horizontal line in the environment outside the vehicle can be restricted. Note that the inclination angle of the vehicle with respect to the road may be detected based on a vehicle behavior and a vehicle model in such a manner that the vehicle behavior such as a yaw rate and a roll rate is detected. Moreover, in the case where an influence of the lateral acceleration during the turning is small, a bearing rotatable about the optical axis 14 maybe provided in the imaging device 11, and a pendulum-like link in which a weight is attached onto a tip may be coupled to a rotation center of the bearing, thereby allowing the imaging device 11 to rotate.

Figure 36:
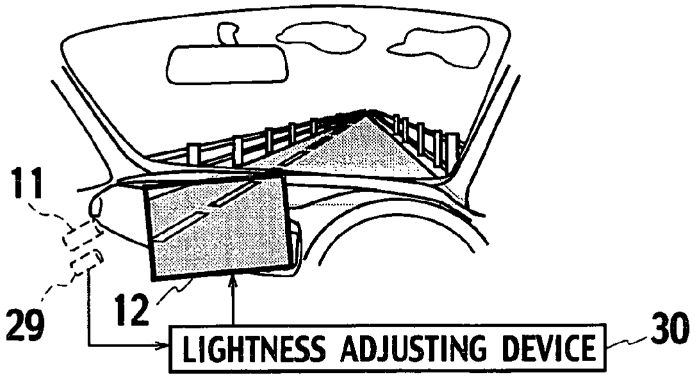
FIG. 36 is a schematic view showing a configuration of an application example of the drive sense adjusting apparatus serving as the twelfth embodiment.

Moreover, as shown in FIG. 36, a lightness detection device 29 for detecting lightness of the range of the environment outside the vehicle, which is imaged by the imaging device 11, maybe provided, and based on a detection result of the lightness detection device 29, lightness and brightness of the displayed image may be varied on the imaging device 11 or the visual stimulus display device 12 by a lightness adjusting device 30. With such a configuration as described above, when the video outside the vehicle, which is displayed on the display screen of the visual stimulus display device 12, is too light as the visual stimulus, the driver can be restricted from feeling trouble. On the contrary, when the video outside the vehicle is too dark, the video can be adjusted to appropriate lightness, and thereafter, the driver is enabled to perceive the visual stimulus. Moreover, color information of the displayed image, such as lightness, chroma and a hue, may be varied in the imaging device 11 or the visual stimulus display device 12.

Figure 37:
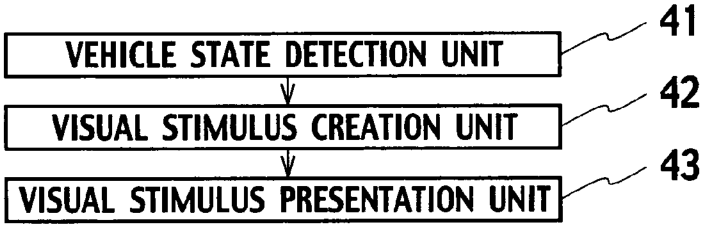
FIG. 37 is a block diagram showing a configuration of a drive sense adjusting apparatus serving as a thirteenth embodiment of the present invention.

As shown in FIG. 37, a drive sense adjusting apparatus serving as a thirteenth embodiment includes, as main constituents, a vehicle state detection unit 41 for detecting a vehicle state such as the vehicle speed and steering angle of the vehicle, a visual stimulus creation unit 42 for creating, in real time, a visual stimulus matched with the vehicle state detected by the vehicle state detection unit 41, and a visual stimulus presentation unit 43 such as a liquid crystal display and an organic EL panel for presenting the visual stimulus created by the visual stimulus creation unit 42 into the peripheral vision of the driver. Then, the drive sense adjusting apparatus having such a configuration as described above performs an operation to be described below, thereby facilitating for the driver to associate the video outside the vehicle and the environment outside the vehicle with each other, and stabilizing the drive sense of the driver. Description will be made below of the configuration of the drive sense adjusting apparatus serving as the thirteenth embodiment of the present invention with reference to the drawings.

Figure 38:
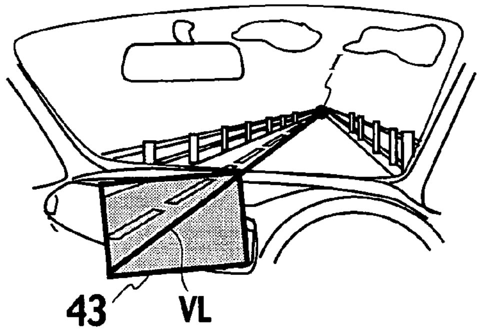
FIG. 38 is a view for explaining a method of defining a virtual spot and a virtual line in the drive sense adjusting apparatus shown in FIG. 37.
Figure 39:
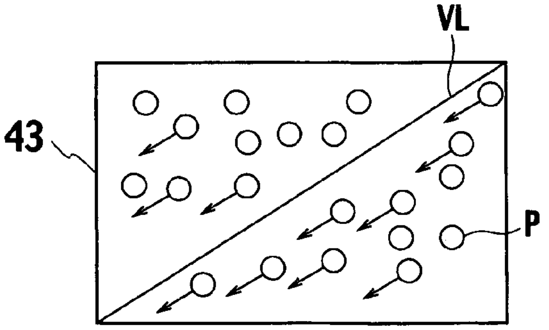
FIG. 39 is a view showing an example of a visual stimulus presented by the drive sense adjusting apparatus shown in FIG. 37.

As shown in FIG. 38, the drive sense adjusting apparatus serving as the thirteenth embodiment of the present invention defines the virtual spot I infinitely far in the vehicle heading direction, and extends a virtual straight line (hereinafter, written as a virtual line) VL from the virtual spot I toward the vehicle on the road. Note that, if it is assumed that the virtual line VL transmits through the visual stimulus presentation unit 43, the virtual line VL is defined also on the visual stimulus presentation unit 43. Then, the visual stimulus creation unit 42 creates visual stimuli moving continuously in parallel to the virtual line VL along therewith, and as shown in FIG. 39, the visual stimulus presentation unit 43 presents the visual stimuli P created by the visual stimulus creation unit 42.

With such a configuration as described above, the road optical flow accompanied with the heading of the vehicle, which is viewed through the front window by the driver, and a flow of a component in the vehicle heading direction of the road optical flow presented by the visual stimulus presentation unit 43 become the same. Accordingly, it is made possible for the driver to perceive the motion direction continuously with the road optical flow viewed through the front window freely from the feeling of wrongness, and the heading perception of the self motion straight ahead is facilitated based on the motion direction of the entire optical flow in which the area is increased.

Note that a moving distance of each visual stimulus per unit time, that is, a moving speed thereof is made proportional to the vehicle speed detected by the vehicle state detection unit 41. Specifically, when the vehicle speed is 30 km per hour, the visual stimulus creation unit 42 creates a visual stimulus P having moved by 40 pixels in the left direction and 30 pixels in the lower direction on the screen at each refresh timing of the visual stimulus presentation unit 43. When the vehicle speed is 60 km per hour, the visual stimulus creation unit 42 creates a visual stimulus P having moved by 80 pixels in the left direction and 60 pixels in the lower direction on the screen.

Moreover, the shape of the visual stimulus P may be an arbitrary shape such as a circle, a rectangle, a star shape and a line shape as long as a motion thereof can be perceived within the region of the peripheral vision (refer to FIG. 7) of the driver. Moreover, when the visual stimulus P reaches a left or lower end of the screen of the visual stimulus presentation unit 43, the visual stimulus presentation unit 43 displays the visual stimulus P repeatedly while moving the visual stimulus P from a right or upper end thereof on a line parallel to the virtual line VL. Furthermore, the virtual line VL is not presented on the screen.

Figure 40:
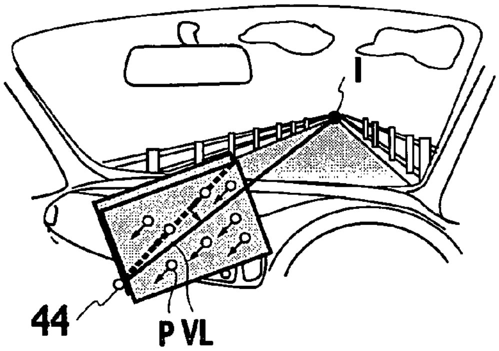
FIG. 40 is a view for explaining a method of correcting a shift between a virtual line defined in the visual stimulus presentation unit and a virtual line defined from the virtual spot ahead of the vehicle.

Moreover, when the viewpoint position of the driver largely moves owing to a change of the driver, and the like, the virtual line VL defined in the visual stimulus presentation unit 43 and the virtual line VL defined from the virtual spot I ahead of the vehicle sometimes shift from each other. In such a case, for example as shown in FIG. 40, a rotation mechanism with a specific spot of the visual stimulus presentation unit 43 taken as a fulcrum 44 is provided, and the visual stimulus presentation unit 43 is rotated by the rotation mechanism. In such a way, it is desirable to make the virtual line VL defined in the visual stimulus presentation unit 43 and the virtual line VL defined from the virtual spot I ahead of the vehicle coincide with each other.

As apparent from the above description, according to the drive sense adjusting apparatus serving as the thirteenth embodiment of the present invention, the optical flow having the same component in the vehicle heading direction, which is the same as that of the optical flow of the road viewed by the driver through the front glass, is displayed on the visual stimulus presentation unit 43, and the visual stimulus corresponding to the road optical flow accompanied with the vehicle motion is presented into the peripheral vision of the driver, which is obstructed by the functional components of the vehicle in the usual vehicle structure. Accordingly, the area of the entire optical flow is increased, thus facilitating for the driver to perceive the heading direction.

Figure 41:
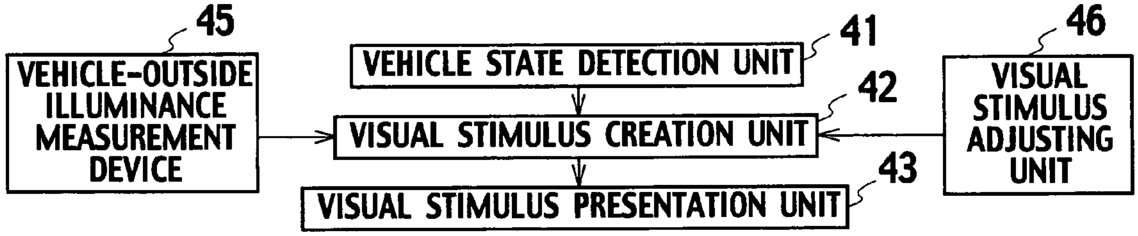
FIG. 41 is a block diagram showing a configuration of a drive sense adjusting apparatus serving as a fourteenth embodiment of the present invention.

As shown in FIG. 41, a drive sense adjusting apparatus serving as a fourteenth embodiment of the present invention includes a vehicle-outside illuminance measurement device 45 for measuring an illuminance outside the vehicle, and a visual stimulus adjusting unit 46 for adjusting a presenting condition for the visual stimulus in the visual stimulus presentation unit 43 in addition to the configuration of the drive sense adjusting apparatus serving as the thirteenth embodiment. Then, the drive sense adjusting apparatus having such a configuration as described above operates as will be described below, thus facilitating for the driver to associate the video outside the vehicle and the environment outside the vehicle with each other, and stabilizing the drive sense of the driver. Description will be made below of the configuration of the drive sense adjusting apparatus serving as the fourteenth embodiment of the present invention with reference to the drawings.

Figure 42:
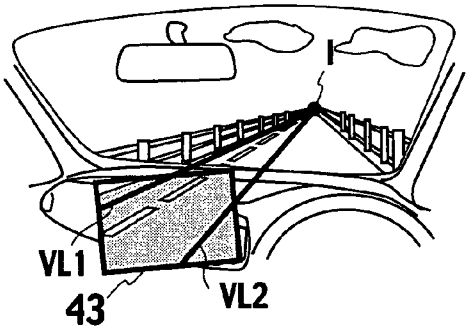
FIG. 42 is a view for explaining a method of defining the virtual spot and the virtual lines in the drive sense adjusting apparatus shown in FIG. 41.

As shown in FIG. 42, the drive sense adjusting apparatus serving as the fourteenth embodiment of the present invention defines the virtual spot I infinitely far in the vehicle heading direction, and extends two virtual lines VL1 and VL2 as virtual straight lines from the virtual spot I toward the vehicle on the road. Note that, if it is assumed that the virtual lines VL1 and VL2 transmit through the visual stimulus presentation unit 43, the virtual lines VL1 and VL2 are defined also on the visual stimulus presentation unit 43.

Figure 43:
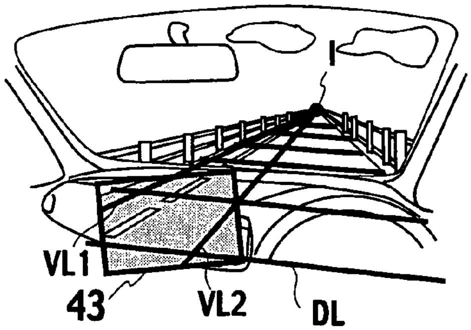
FIG. 43 is a view for explaining a method of defining display lines in the drive sense adjusting apparatus shown in FIG. 41.
Figure 44:
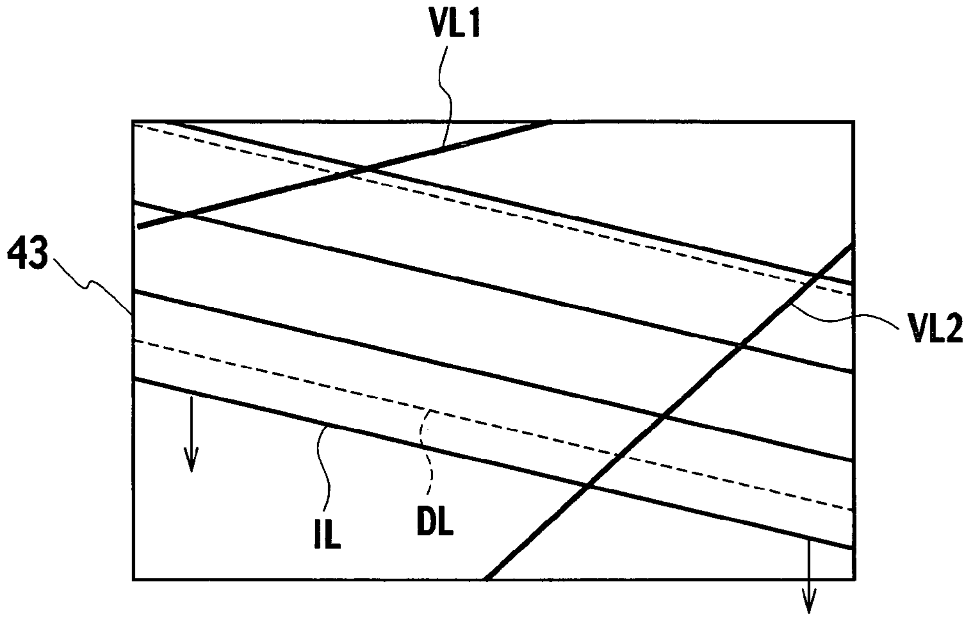
FIG. 44 is a view showing an example of visual stimuli presented by the drive sense adjusting apparatus shown in FIG. 41.

Next, as shown in FIG. 43, the visual stimulus creation unit 42 defines plural display lines DL at an equal interval in a direction spatially perpendicular to the virtual lines VL1 and VL2, for example, in a crosswise direction to the heading direction. Specifically, the visual stimulus creation unit 42 defines the plural lines DL in which a density is high in the vicinity of the virtual spot I and low in the vicinity of the vehicle. Next, the visual stimulus creation unit 42 creates, as the visual stimulus, plural information lines IL moving continuously while maintaining a parallel relationship to the display lines DL, and as shown in FIG. 44, the visual stimulus presentation unit 43 presents the information liens IL created by the visual stimulus creation unit 42.

Here, a moving distance of each information line IL per unit time, that is, a moving speed thereof is made proportional to the vehicle speed detected by the vehicle state detection unit 41. Specifically, when the vehicle speed is 30 km per hour, the visual stimulus creation unit 42 creates an information line IL having moved by 30 pixels in the lower direction on the screen at each refresh timing of the visual stimulus presentation unit 43. When the vehicle speed is 60 km per hour, the visual stimulus creation unit 42 creates an information line IL having moved by 60 pixels in the lower direction on the screen. Moreover, when the information line IL reaches the lower end of the screen of the visual stimulus presentation unit 43, the visual stimulus presentation unit 43 displays the information line IL repeatedly while moving the information line IL from the upper end of the screen. In addition, the virtual lines VL1 and VL2 and the display lines DL are not displayed actually.

Figure 45:
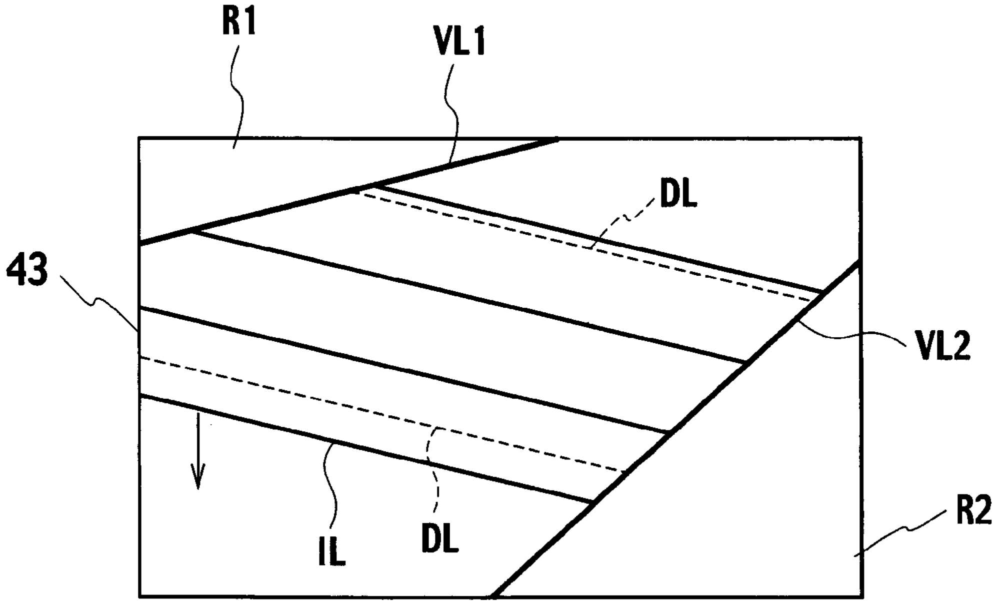
FIG. 45 is a view showing an example of a visual stimulus presented in a case of setting masking areas.

Note that, as shown in FIG. 45, at this time, the visual stimulus presentation unit 45 may set screen regions R1 and R2 surrounded by the respective virtual lines VL1 and VL2, the left and right ends of the screen and the upper and lower ends thereof as masking areas, and may display the information lines IL only between the virtual lines VL1 and VL2 without displaying the information lines IL on the masking areas R1 and R2 thus set. Moreover, the visual stimulus adjusting unit 46 may vary the brightness of the entire display screen of the visual stimulus presentation unit 43, such as a brightness of a backlight when the visual stimulus presentation unit 43 is a liquid crystal display, in response to the illuminance outside the vehicle, which has been measured by the vehicle-outside illuminance measurement device 45.

Figure 46A:
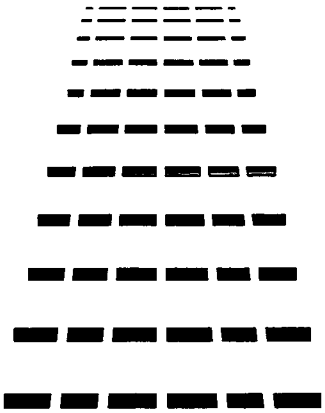
FIGS. 46A and 46B are views showing examples of a geometric perspective.
Figure 46B:
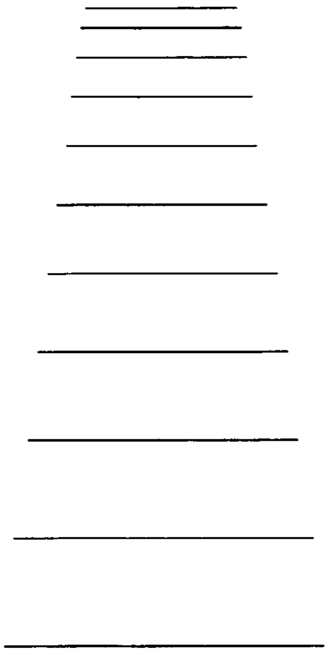
Figure 47:
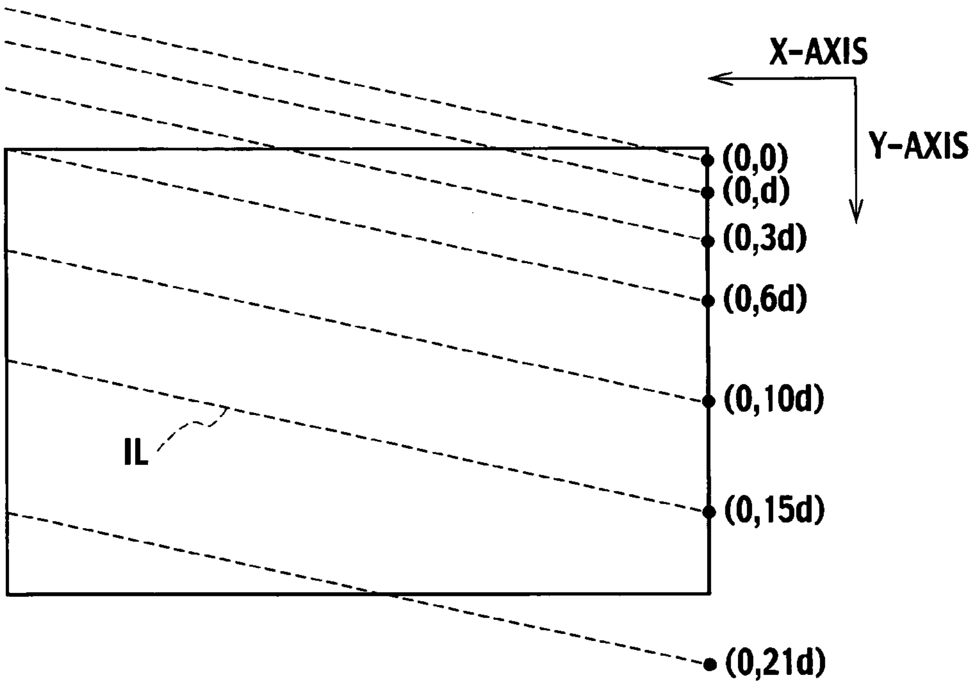
FIG. 47 is a view showing an example of a method of imparting the geometric perspective to information lines.

Moreover, in general, it is known that, in the case of viewing such a comparatively broad plane as corresponding to a floor or the ground, a perception of a plane expanding in the depth direction is affected by a size variation and a density variation, which is thus affected not by a shape of an object but largely by the perspective method (for example, refer to THE VISION SOCIETY OF JAPAN, Ed., Visual Information Processing Handbook (in Japanese), Asakura Shoten). Accordingly, as shown in FIGS. 46A and 46B, the visual stimulus creation unit 42 may impart a geometric perspective such as a texture gradient and a line perspective to the information lines IL. Specifically, in this case, as shown in FIG. 47, the visual stimulus creation unit 42 defines an XY coordinate with an upper right end point of the visual stimulus presentation unit 43 taken as an origin (0, 0), and creates the plural information lines IL passing through a point (0, n−1°d) ($n \geqq 1$, $d>0$) and having the same gradient as that of the display lines DL.

Note that, in the case of displaying the information lines IL while making a movement thereof, the moving distance thereof is increased as the Y coordinate is increased. Moreover, in addition to display intervals of the information lines IL, a thickness of each information line IL is thickened, thus making it possible to express the information lines IL while emphasizing the perspective. Furthermore, the above-described masking areas R1 and R2 are set, thus making it possible to display the information lines IL while further emphasizing the perspective by the lengths and intervals thereof.

Figure 48:
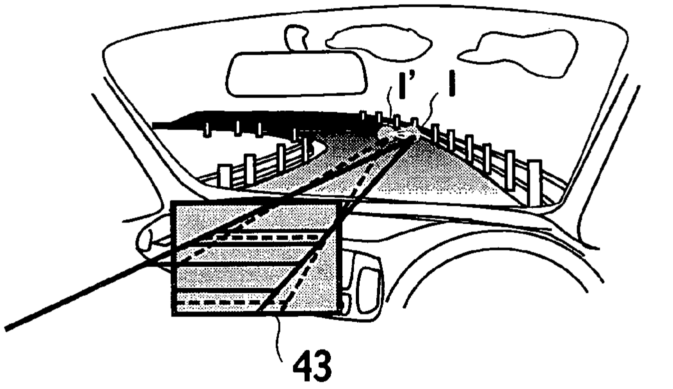
FIG. 48 is a view for explaining a method of correcting a shift between the virtual lines defined in the visual stimulus presentation unit and the virtual lines defined from the virtual spots ahead of the vehicle.

Moreover, owing to an influence of the vehicle behavior such as the rolling, the virtual lines VL defined in the visual stimulus presentation unit 43 and the virtual lines VL defined from the virtual spot I ahead of the vehicle sometimes shift from each other. In such a case, the inclination angle of the vehicle with respect to the road, such as the roll rate and the yaw rate, is detected in the vehicle state detection unit 41, and based on a detection result, a position of the virtual spot I is moved in the crosswise direction or the vertical direction with respect to the vehicle heading direction as shown in FIG. 48. In such a way, it is desirable to make the virtual lines VL defined in the visual stimulus presentation unit 43 and the virtual lines VL defined from the virtual spot I ahead of the vehicle coincide with each other.

Note that, since the virtual spot I and the virtual lines VL are not actually displayed on the visual stimulus presentation unit 43, one that is actually affected by the influence of the vehicle behavior on the display is only the information lines IL. Accordingly, the information lines IL may also be created so that a gradient of the information lines can be spatially perpendicular to the vehicle heading direction. Specifically, if the influence is of a roll rate on the right side in the vehicle heading direction, it is satisfactory if the right side of each information line IL be inclined upward, or the left side thereof be inclined downward, or in both ways in response to the roll angle of the vehicle. Moreover, the information lines IL may also be inclined by moving the virtual spot I to the left side.

Moreover, also in the case where the viewpoint position of the driver is varied owing to the change of the driver, and the like, as described above, the virtual lines VL defined in the visual stimulus presentation unit 43 and the virtual lines VL defined from the virtual spot I ahead of the vehicle sometimes shift from each other. Accordingly, it is recommended that the virtual spot I be able to be moved in the vertical direction or the crosswise direction by an operation of the driver, such as turning of a switch. Furthermore, in the embodiment described above, a device (for example, refer to Japanese Patent No. 3465566) for detecting the eye position of the driver based on image data including the face of the driver may be provided, and the virtual spot I may be defined by using a detection result of the device concerned.

As apparent from the above description, according to the drive sense adjusting apparatus serving as the fourteenth embodiment of the present invention, among the road optical flow accompanied with the heading of the vehicle, a moving component thereof in the lateral direction with respect to the vehicle heading direction is displayed, and accordingly, thus making it possible to facilitate the heading perception by means of the minimum display information. Moreover, even if the eyeball position E of the driver is moved in the lateral direction, the driver can perceive the motion direction continuously with the road optical flow viewed through the front window freely from the feeling of wrongness.

Moreover, according to the drive sense adjusting apparatus serving as the fourteenth embodiment of the present invention, to the display information, imparted can be a depth sense continuous with a depth sense of the road viewed through the front window by the driver, and accordingly the heading perception can be facilitated by means of more natural display information. Moreover, the movement of the virtual spot I makes the change of the gradient of the information lines IL. Accordingly, the gradient shift of the virtual lines IL from the road optical flow viewed through the front window, which is caused by the influence of the vehicle behavior such as the rolling, can be solved, and the heading perception can be facilitated by means of the natural display information irrespective of the vehicle behavior.

Furthermore, according to the drive sense adjusting apparatus serving as the fourteenth embodiment of the present invention, it is possible to solve such inconsistency between the virtual lines VL defined in the visual stimulus presentation unit 43 and the virtual lines VL defined from the virtual spot I ahead of the vehicle, which may be caused when the sight position largely moves owing to the change of the driver, and the like. Accordingly, the heading perception can be facilitated by means of the natural display information irrespective of the variation of the viewpoint position of the driver.

Figure 49:
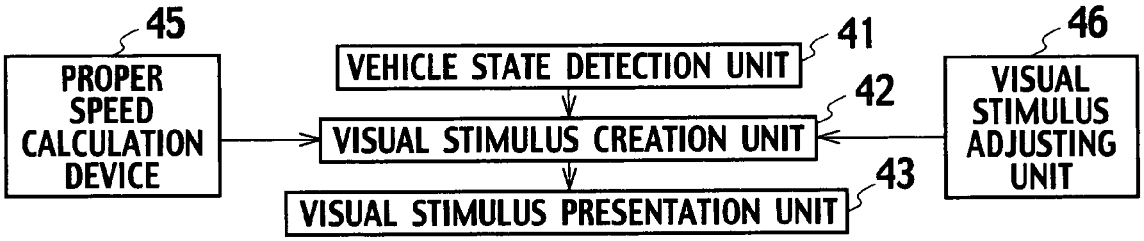
FIG. 49 is a block diagram showing a configuration of a drive sense adjusting apparatus serving as a fifteenth embodiment of the present invention.

As shown in FIG. 49, a drive sense adjusting apparatus serving as a fifteenth embodiment of the present invention has a configuration in which the vehicle-outside illuminance measurement device 45 in the drive sense adjusting apparatus serving as the fourteenth embodiment is replaced by a proper speed calculation device 47. The proper speed calculation device 47 is composed of a navigation system storing proper speed information for a specific road, and the like, and calculates a proper speed for the road where the vehicle is traveling. The drive sense adjusting apparatus having such a configuration as described above performs operations to be described below, thus facilitating for the driver to associate the video outside the image and the environment outside the vehicle with each other, and stabilizing the drive sense of the driver. Description will be made below of the configuration of the drive sense adjusting apparatus serving as the fifteenth embodiment of the present invention with reference to the drawings.

Figure 50:
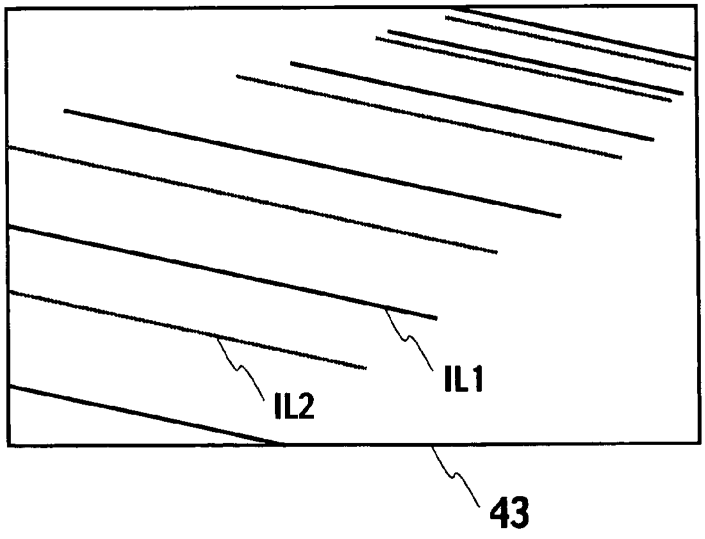
FIG. 50 is a view showing an example of a visual stimulus presented by the drive sense adjusting apparatus shown in FIG. 41.

In the drive sense adjusting apparatus serving as the fifteenth embodiment of the present invention, the visual stimulus creation unit 42 creates, as the visual stimulus, two types of information lines IL1 and IL2 moving continuously while maintaining a parallel relationship to the display line DL, and as shown in FIG. 50, the visual stimulus presentation unit 43 presents the information lines IL created by the visual stimulus creation unit 42. Note that, at this time, a moving speed of the information lines IL1 is made to correspond to the running speed of the vehicle itself, and a moving speed of the information lines IL2 is made to correspond to the proper speed calculated by the proper speed calculation device 47. Specifically, when the vehicle runs at 30 km per hour on a road in which the proper speed is 60 km per hour, the visual stimulus creation unit 42 moves each information line IL2 by 60 pixels in the lower direction on the screen, and moves each information line IL1 by 30 pixels in the lower direction on the screen.

At this time, in the case of applying the geometric perspective to the information lines IL1 and IL2, the display moving distances thereof differ between the upper end of the screen and the lower end of the screen. Accordingly, it is needless to say that the above-described values are mean values of the moving quantities of the respective information lines. Moreover, between the display lines IL1 and IL2, the display brightness, or the chroma or lightness of a display is different. Accordingly, the driver can perceive that the information lines IL1 and IL2 concerning two different speed components are displayed to be moved. Meanwhile, it is conceived that the display lines IL1 and IL2 are superimposed on each other because the display moving speeds of the display lines IL1 and IL2 differ from each other. In this case, desirably, the display brightness, the chroma or lightness of the display color, or a combination of both in the superimposed information lines IL1 and IL2 take the respective intermediate values thereof. In such a way, the respective information lines IL1 and IL2 can be perceived while maintaining continuity of the flows thereof.

As apparent from the above description, according to the drive sense adjusting apparatus serving as the fifteenth embodiment of the present invention, the flows perceived while maintaining the continuity at the two types of speeds are displayed, thus making it possible to present a speed difference component that is faster or slower than a target speed or equal thereto, that is, a relative speed. Moreover, a magnitude of the speed difference is expressed by a cycle change of the display brightness. Accordingly, the magnitude of the speed difference can be presented as information perceivable within a peripheral vision region that is excellent in acquisition for temporal information concerning a lightness variation and perception of an object (for example, refer to Tadahiko Fukuda, Functional Difference Between Central Vision and Peripheral Vision in Driving Perception (in Japanese), Journal of the Institute of Television Engineers of Japan, vol. 32, No. 6, pp. 492 to 498).

As above, description has been made of the embodiments to which the invention created by the inventors of the present invention is applied. However, the present invention is not limited to the descriptions and the drawings, which form a part of the disclosure of the present invention according to these embodiments. Specifically, all of other embodiments, examples, operational techniques and the like, which are made by those skilled in the art based on these embodiments, are naturally incorporated in the scope of the present invention. The above is additionally described at the end of this specification.

The entire content of Japanese Patent Application No. TOKUGAN 2004-225820 with a filing date of Aug. 2, 2004, and Japanese Patent Application No. TOKUGAN 2005-145404 with a filing date of May 18, 2005, is hereby incorporated by reference.

What is claimed is:

1. A drive sense adjusting apparatus for adjusting a drive sense of a driver, the drive sense adjusting apparatus being provided in a vehicle, comprising:

a visual stimulus presentation unit provided in a vision of the driver;

a driving environment detection unit for detecting a driving environment outside the vehicle;

a vehicle status detection unit for detecting a state quantity of the vehicle;

a driver status detection unit for detecting a drive state of the driver; and a control unit for presenting a visual stimulus to the visual stimulus presentation unit, and for controlling the visual stimulus, the control unit comprising:

a visual stimulus producing unit configured to produce the visual stimulus; and a visual stimulus motion controller configured to control motion of the visual stimulus produced by the visual stimulus producing unit in response to at least one detection result of the driving environment detection unit, the vehicle status detection unit and the driver status detection unit, the controlled motion of the visual stimulus providing the driver with a perception of the visual stimulus approaching the driver or receding therefrom, and with a visually induced self motion perception.

2. The drive sense adjusting apparatus according to claim 1, wherein the control unit assumes at least one virtual spot in the vision of the driver, and controls the visual stimulus to allow the driver to perceive the visual stimulus approaching the driver or receding therefrom from the virtual spot.

3. The drive sense adjusting apparatus according to claim 2, wherein the control unit estimates a focus of expansion, and assumes, as a virtual spot, the estimated focus of expansion or a spot in a vicinity thereof.

4. The drive sense adjusting apparatus according to claim 3, wherein the control unit defines a virtual plane vertical to a straight line connecting an eyeball position of the driver and the virtual spot to each other, divides the virtual plane into plural regions, and controls the visual stimulus to be projected on at least one of the plural regions when the visual stimulus presented to the visual stimulus presentation unit is projected on the virtual plane.

5. The drive sense adjusting apparatus according to claim 4, wherein, when the control unit sets a circular or square region with an intersection of the straight line connecting the eyeball position of the driver and the virtual spot to each other and the virtual plane taken as a center, and projects the visual stimulus presented to the visual stimulus presentation unit on the virtual plane, the control unit controls so that the visual stimulus cannot be projected within the set circular or square region or a transmittance of the visual stimulus in the set circular or square region can become higher than a transmittance of the visual stimulus in other regions.

6. The drive sense adjusting apparatus according to claim 4, wherein, when the control unit divides the virtual plane into two regions in a horizontal direction, and projects the visual stimulus presented to the visual stimulus presentation unit on the virtual plane, the control unit controls the visual stimulus to be projected only on a lower region thus divided.

7. The drive sense adjusting apparatus according to claim 4, wherein, when the control unit radially divides the virtual plane with a vehicle heading direction taken as a center, and projects the visual stimulus presented to the visual stimulus presentation unit on the virtual plane, the control unit controls the visual stimulus, in response to a running condition, to be projected on at least one of the regions radially divided.

8. The drive sense adjusting apparatus according to claim 2, wherein the control unit varies, uniformly or step by step, at least one of a brightness, contrast, color, density and opacity of the visual stimulus in response to a distance from the virtual spot.

9. The drive sense adjusting apparatus according to claim 1, wherein the control unit includes unit that detects light quantities outside the vehicle and inside a cabin, and varies at least one of the brightness, contrast, color, density and opacity of the visual stimulus uniformly or step by step in response to the light quantities outside the vehicle and inside the cabin.

10. The drive sense adjusting apparatus according to claim 2, wherein the control unit determines whether or not there is a lurch of the vehicle for a fixed time based on the detection result of the vehicle status detection unit, and when the lurch of the vehicle exists, presents the visual stimulus from the virtual point fixed to a global coordinate system.

11. The drive sense adjusting apparatus according to claim 1, wherein the control unit determines whether or not the heading direction of the vehicle is obscure for the driver based on the detection result of the driving environment detection unit, and when the heading direction of the vehicle is obscure for the driver, presents the visual stimulus.

12. The drive sense adjusting apparatus according to claim 1, wherein the control unit determines whether or not a degree of arousal of the driver is low or whether or not the driver is looking aside while driving based on the detection result of the driver status detection unit, and when the degree of arousal of the driver is low or when the driver is looking aside while driving, presents the visual stimulus.

13. The drive sense adjusting apparatus according to claim 2, wherein, in response to an angle variation of a vector of acceleration about an axis of the vehicle heading direction, the acceleration being applied to the driver or the vehicle, the control unit rotationally displaces the visual stimulus about an axis of a sight of the driver and in the same direction as a direction of an angle variation of the vector of acceleration.

14. The drive sense adjusting apparatus according to claim 2, wherein the control unit moves the virtual spot in a left or right direction and a lower direction by a distance proportional to a steering angle of the vehicle.

15. A drive sense adjusting method for adjusting a drive sense of a driver, the drive sense adjusting method being provided in a vehicle, comprising the steps of:

detecting a driving environment outside the vehicle;

detecting a state quantity of the vehicle;

detecting a drive state of the driver;

producing a visual stimulus;

controlling motion of the produced visual stimulus in response to at least one of the detected driving environment, vehicle status and driver status, the controlled motion of the visual stimulus providing the driver with a perception of the visual stimulus approaching the driver or receding therefrom, and with a visually induced self-motion perception; and presenting the visual stimulus.

* * * * *